(12) United States Patent
Piciaccia et al.

(10) Patent No.: US 12,126,375 B2
(45) Date of Patent: Oct. 22, 2024

(54) AUTOMATIC TREND IDENTIFICATION AND ANOMALY DETECTION IN OPTICAL CHANNEL MONITORING SPECTRUM

(71) Applicants: Cisco Technology, Inc., San Jose, CA (US); Politecnico di Milano, Dipartimento di Elettronica, Informazione e Bioingegneria, Milan (IT)

(72) Inventors: Stefano Piciaccia, Milan (IT); Pietro Invernizzi, Varese (IT); Enrico Sozio, Monza (IT); Alberto Arnaldo Tanzi, Trezzano sul Naviglio (IT); Prasenjeet Acharjee, Bangalore (IN); Antonino Maria Rizzo, Castelvetrano (IT); Giacomo Boracchi, Buccinasco (IT); Luca Magri, Milan (IT); Cesare Alippi, Mandello del Lario (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 195 days.

(21) Appl. No.: 17/843,285

(22) Filed: Jun. 17, 2022

(65) Prior Publication Data
US 2023/0412267 A1 Dec. 21, 2023

(51) Int. Cl.
H04B 10/079 (2013.01)
(52) U.S. Cl.
CPC ................................. *H04B 10/0795* (2013.01)
(58) Field of Classification Search
CPC .................................................. H04B 10/0795
USPC .......................................................... 398/20
See application file for complete search history.

(56) References Cited

U.S. PATENT DOCUMENTS

| | | | |
|---|---|---|---|
| 8,971,705 B2 * | 3/2015 | Boertjes | H04J 14/0276 398/38 |
| 9,871,705 B2 * | 1/2018 | Hockett | H04L 43/04 |
| 9,986,317 B1 * | 5/2018 | Al Sayeed | H04J 14/0212 |
| 10,439,709 B1 * | 10/2019 | Al Sayeed | H04B 10/03 |
| 2002/0089665 A1 | 7/2002 | Ishihara et al. | |

(Continued)

FOREIGN PATENT DOCUMENTS

| | | | | |
|---|---|---|---|---|
| EP | 1705811 A1 * | 9/2006 | | H04B 10/0791 |
| JP | 2012527189 A * | 1/2012 | | |

OTHER PUBLICATIONS

Lun et al; (oft Failure Identification for Long-haul Optical Communication Systems Based on One-dimensional Convolutional Neural Network; Jun. 2020; Journal of lightwave technology, vol. 38, No. 11; pp. 1-8. (Year: 2020).*

(Continued)

*Primary Examiner* — Amritbir K Sandhu
(74) *Attorney, Agent, or Firm* — Edell, Shapiro & Finnan, LLC

(57) ABSTRACT

In some aspects, the techniques described herein relate to a method that includes: obtaining optical channel spectrum data that includes amplified spontaneous emission data and channel data associated with optical signals propagated through an optical fiber; fitting an amplified spontaneous emission trend to the amplified spontaneous emission data; fitting a channel trend to the channel data; jointly optimizing the amplified spontaneous emission trend and the channel trend to determine an optimized channel trend; and determining an anomaly in the channel data based upon the optimized channel trend.

20 Claims, 15 Drawing Sheets

(56) References Cited

U.S. PATENT DOCUMENTS

| | | | |
|---|---|---|---|
| 2010/0008663 A1* | 1/2010 | Gottwald | ......... H04B 10/07953 |
| | | | 398/26 |
| 2013/0330071 A1 | 12/2013 | He et al. | |
| 2017/0279526 A1* | 9/2017 | Bownass | ................. H04J 14/02 |
| 2018/0269964 A1* | 9/2018 | Mertz | ..................... G02B 6/43 |
| 2019/0305845 A1 | 10/2019 | Cyr et al. | |

OTHER PUBLICATIONS

Lonardi et al; Optical Nonlinearity Monitoring and Launch Power Optimization by Artificial Neural Networks; May 2020; Journal of lightwave technology, vol. 38, No. 9; pp. 1-9. (Year: 2020).*

Lun et al; soft Failure Identification for Long-haul Optical Communication Systems Based on One-dimensional Convolutional Neural Network; Jun. 2020; Journal of lightwave technology, vol. 38, No. 11; p. 1-8. (Year: 2020).*

Locatelli, et al., "Spectral processing techniques for efficient monitoring in optical networks," Journal of Optical Communications and Networking, Mar. 2021, 10 pages.

Li, et al., "Optical spectrum feature analysis and recognition for optical network security with machine learning," Research Article, Optics Express 24808, vol. 27, No. 17, Aug. 19, 2019, 20 pages.

\* cited by examiner

AUTOMATIC TREND IDENTIFICATION AND ANOMALY DETECTION IN OPTICAL CHANNEL MONITORING SPECTRUM

TECHNICAL FIELD

The present disclosure relates to transmission of signals utilizing optical signals and media.

BACKGROUND

Optical performance monitoring (OPM) is used for managing high-capacity dense wavelength division multiplexing (DWDM) optical transmission and switching systems. OPM involves assessing the quality of a data channel by measuring its optical characteristics without directly looking at the transmitted sequence of bits. It is a potential mechanism to improve control of transmission and physical layer fault management in optical transmission systems.

In optical communications, typical roles for OPM include ensuring correct switching in reconfigurable optical add-drop multiplexers, setting levels for dynamic equalization of the gain of optical amplifiers, and providing system alarms and error warning for lost or out of specification optical channels.

One of the components used for OPM in DWDM networks is known as an optical performance monitor or an optical channel monitor (OCM), which measures signal power along the entire wavelength spectrum in terms of, for example, decibel-milliwatts (dBm).

DESCRIPTION OF EXAMPLE EMBODIMENTS

Overview

Figure 1:
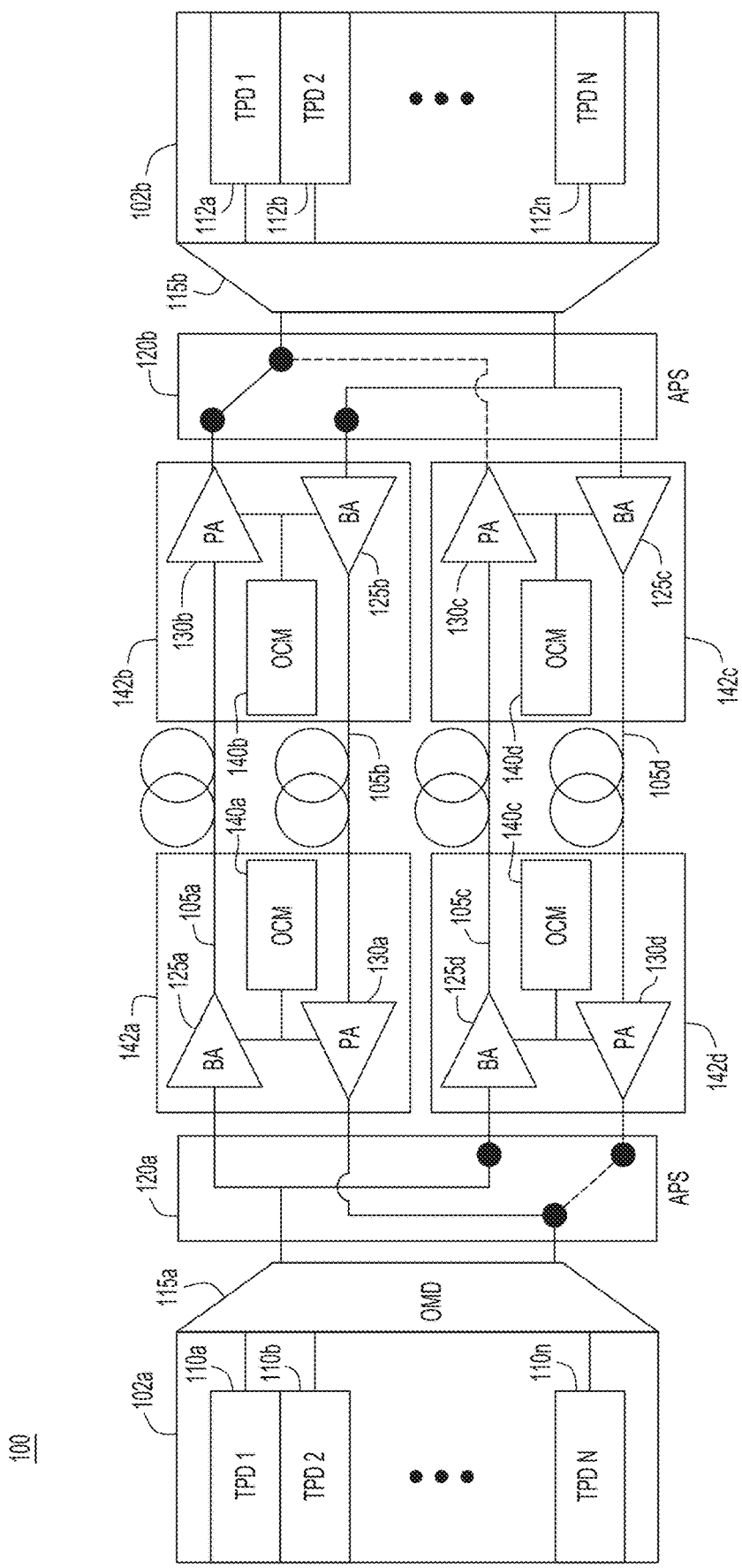
FIG. 1 is a functional block diagram of an optical system configured to implement the optical channel trend identification and anomaly detection techniques of the present disclosure.

In some aspects, the techniques described herein relate to a method that includes: obtaining optical channel spectrum data that includes amplified spontaneous emission data and channel data associated with optical signals propagated through an optical fiber; fitting an amplified spontaneous emission trend to the amplified spontaneous emission data; fitting a channel trend to the channel data; jointly optimizing the amplified spontaneous emission trend and the channel trend to determine an optimized channel trend; and determining an anomaly in the channel data based upon the optimized channel trend.

In other aspects, the techniques described herein relate to an apparatus including: one or more input/output interfaces; and one or more processors configured to: obtain, via the one or more input/output interfaces, optical channel spectrum data that includes amplified spontaneous emission data and channel data associated with optical signals propagated through an optical fiber; fit an amplified spontaneous emission trend to the amplified spontaneous emission data; fit a channel trend to the channel data; jointly optimize the amplified spontaneous emission trend and the channel trend to determine an optimized channel trend; and determine an anomaly in the channel data based upon the optimized channel trend.

In still other aspects, the techniques described herein relate to one or more tangible, non-transitory computer readable mediums encoded with instructions, wherein the instructions, when executed by one or more processors, are operable to: obtain optical channel spectrum data that includes amplified spontaneous emission data and channel data associated with optical signals propagated through an optical fiber; fit an amplified spontaneous emission trend to the amplified spontaneous emission data; fit a channel trend to the channel data; jointly optimize the amplified spontaneous emission trend and the channel trend to determine an optimized channel trend; and determine an anomaly in the channel data based upon the optimized channel trend.

Example Embodiments

This disclosure concerns the automatic identification and removal of trends in generic Dense Wavelength-Division Multiplexing (DWDM) spectrum measurements acquired from, for example, Optical Channel Monitoring (OCM) devices. Automatic trend identification may be beneficially used in resolving channel discovery and anomaly detection problems.

Ideally, the power in the channels transmitted through an optical fiber will be equalized—i.e., each channel will be transmitted with equal power. In practice, however, fibers and amplifiers modify the spectrum, possibly introducing severe trends, making channel discovery a challenging problem. Poor trend estimates lead to bad channel discovery, and thus poorly regulated amplifier gain. Accurate trend estimates may also assist in identifying anomalous peaks that do not conform to the channel trend. Accordingly, presented herein are techniques to automatically analyze OCM spectra in order to:

Estimate channels, including the number of channels and their central frequencies;

Detect anomalies, such as wrongly equalized channels or channels detected in the creation/insertion phase for the optical channel;

Detect the channel trends, even in the presence of only a few channels; and/or

Automatically remove any trend induced by tilting from amplification or distortions from signal propagation without needing to use supervision or annotated training sets.

As discussed below, a joint optimization procedure is used to simultaneously estimate an optical channel trend and an Amplified Spontaneous Emission (ASE) trend. This joint optimization is achieved through a robust fitting procedure and promotes similarity among ASE and channels trends. As a result, the system may effectively detect anomalies, without influencing the fitting outcomes.

With reference now made to FIG. 1, depicted therein is a DWDM optical system 100 that provides for an optical communication channel between a first termination point 102a and a second termination point 102b. Optical fibers 105a-d provide a medium via which optical signals are transmitted between termination points 102a and 102b. More specifically, optical fibers 105a and 105c transmit signals from termination point 102a to termination point 102b, while optical fibers 105b and 105d transmit signals from termination point 102b to termination point 102a. Termination point 102a includes a plurality of transponders 110a, 110b, 110n (110a-n), each associated with a different wavelength of light, and termination point 102b includes a plurality of corresponding transponders 112a, 112b, . . . , 112n (112a-n). Electrical signals receive by transponders 110a-n are converted to optical signals corresponding to the wavelength associated with the respective transponder. The optical signals are provided to optical multiplexer/demultiplexer 115a which combines the signals of different wavelengths into a multiplexed optical signal. The multiplexed signal is provided to automatic protection switch 120a, is amplified by boost amplifiers 125a and 125d, and transmitted to second termination point 102b by optical fibers 105a and 105c.

The transmitted signals are received and amplified by preamplifiers 130b and 130c, provided to automatic protection switch 120b of termination point 102b, demultiplexed by optical multiplexer/demultiplexer 115b, and provided to the one of transponders 112a-n that corresponds to the wavelength of the received signal. The optical signal may then be converted to an electrical signal. While FIG. 1 includes protection switches 120a and 120b, other example optical systems 100 may omit protection switches 120a and 120b.

An analogous signal path may be provided from transponders 112a-n of termination point 102b to transponders 110a-n of termination point 102a by optical multiplexer/demultiplexer 115b, automatic protection switch 120b, boost amplifiers 125b and 125c, optical fibers 105b and 105d, preamplifiers 130a and 130d, automatic protection switch 120a and optical multiplexer/demultiplexer 115a.

Termination points 102a and 120b may be embodied as the original source or final destination an optical signal, as well as an intermediate termination point for the optical signals. For example, though not illustrated in FIG. 1, the optical paths between termination point 102a and termination point 102b along optical fibers 105a-d may include one or more in-line amplifiers that amplify the optical signals at intermediate points between termination point 102a and termination point 102b. In such example optical systems, multiple optical fiber sections may be arranged between the in-line amplifiers along the optical paths between termination point 102a and termination point 102b.

Optical data traveling through DWDM optical system 100 may undergo several spectrum modifications, such as:

1. insertion of ASE,
2. spectrum tilting,
3. non-linear effects,
4. modifications due to degradation of the fiber over time,
5. chromatic dispersion, and
6. wavelength dependent fiber attenuation, just to mention a few examples.

Figure 2:
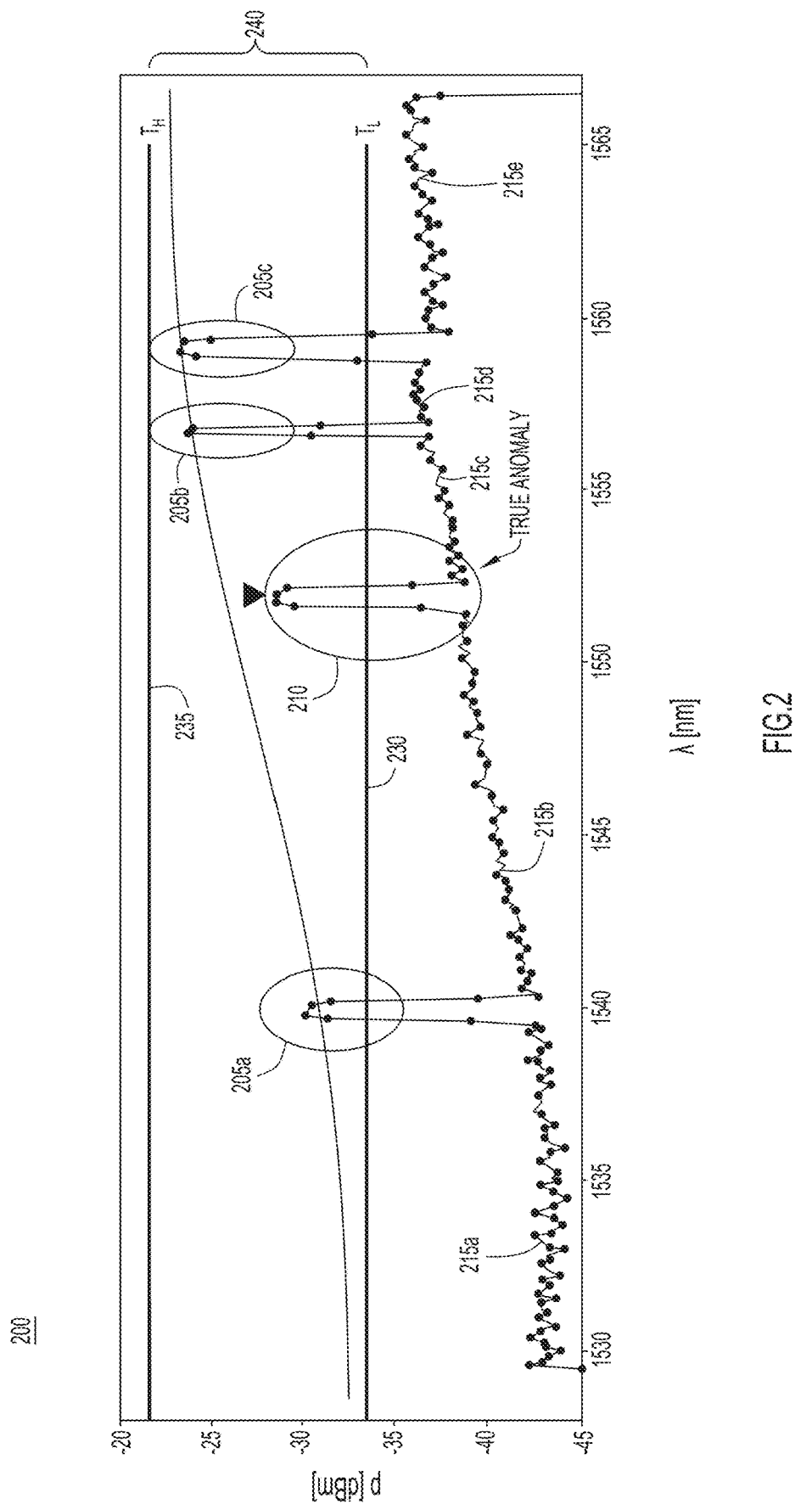
FIG. 2 presents first optical channel spectrum data to which the optical channel trend identification and anomaly detection techniques of the present disclosure may be applied, according to an example embodiment.

Anomalous data may appear within the optical channel data received at termination points 102a or 102b. Turning to FIG. 2, depicted therein is example spectrum data 200 that may be received at a termination point, such as termination points 102a or 102b of FIG. 1. Spectrum data 200 illustrates the power of the optical channel data in the frequency domain rather than the time domain. Because the wavelength of light is directedly related to its frequency by the speed of light, the x-axis of FIG. 2 uses wavelength $\lambda$ as its label. Furthermore, given this relationship between wavelength and frequency in optical signals, the optical channel data 205a, 205b and 205c (205a-c) appears as bumps within the spectrum data 200. Appropriately controlling the power of an optical channel may include identifying the optical channels within spectrum data so that the wavelengths associated with the optical channels may be appropriately amplified.

It may not be easy to identify at the termination point (e.g., intermediate or destination optical nodes, such as termination points 102a and 102b of FIG. 1) which channels have good power levels versus others that may have been degraded/distorted. Any application that regulates the power control of the amplifier requires knowing the channel combination of the power spectrum, thus such regulation needs to successfully address the Channel Discovery problem, i.e., the problem of distinguishing channel data from other features within the optical channel spectrum. For example, illustrated in FIG. 2 is an anomaly 210, which may be difficult to distinguish from the spectrum data associated with a properly regulated optical channel, such as channel data 205a-c.

Addressing the Channel Discovery problem is not an easy task since the number of possible channel combinations passing through the amplifier of the optical channel is arbitrary and the channels are not required to be on a fixed grid. For example, the number of channels may range from one up to the maximum capacity of the amplified spectrum. At the time of the filing of the present disclosure, certain amplifiers may support 120 or more channels. Additionally, anomalies (e.g., peaks within a frequency spectrum such as anomaly 210) that do not meet the channel power and do not follow the channel trend further complicate this task. Anomaly detection capabilities are therefore important to locate these anomalies and possibly trigger countermeasures that fix the root causes of anomalies.

As illustrated in FIG. 2, the optical channel data 205a-c may be difficult to differentiate from anomaly 210 due to, for example, a tilt introduced into the optical spectrum data 200. The tilt in spectrum data 200 may be understood by examining the ASE data 215a, 215b, 215c, 215d, 215e (215a-e). As illustrated in FIG. 2, ASE data 215a-e undergoes a gradual increase in power across the frequency spectrum. This increase in power is referred to as spectrum tilting.

Certain related art anomaly detections techniques are based on a single channel threshold criterion that defines a peak-to-peak delta value to detect the presence/absence of the channels. The amplifier gain control application reports a channel in the spectrum as an anomaly when a power maximum is not within the peak-to-peak delta value, thus stopping the power regulation of these peaks. This single channel threshold criterion can only handle anomalies in spectra that do not exhibit a trend, or equivalently when the trend of the spectrum is horizontal. However, in several real-world scenarios, such as when the channel combination changes over time, when there are sudden changes in spectrum tilt, or when there are temporary/permanent concentrated fiber attenuations at different fiber distances, the mean power spectral density follows a dynamic trend and peak-to-peak delta value is too simple a criterion to detect anomalies, as peak-to-peak delta value anomaly detection techniques do not take into account the spectrum trend. FIG. 2 illustrates a situation where the peak-to-peak delta criterion fails at detecting anomalies, such as anomaly 210.

Included in FIG. 2 are lower threshold 230 and upper threshold 235, with the area therebetween being the above-described peak-to-peak delta value 240. Absent the tilt illustrated in spectrum data 200, the peak value of anomaly 210 would not fall within peak-to-peak delta value 240. However, as shown in FIG. 2, because the tilt of spectrum data 200 increases with increasing frequency, the peak value of anomaly 210 does fall within peak-to-peak delta value 240. Accordingly, techniques that rely on such peak-to-peak delta values may not accurately identify anomalies like anomaly 210.

Returning to FIG. 1, included in optical system 100 are optical channel monitors (OCMs) 140a-d that are configured to implement anomaly detection techniques that may identify anomalies like anomaly 210 of FIG. 2, even in optical spectrum data that exhibits tilts like spectrum data 200 of FIG. 2.

OCMs 140a-d detect the outputs of boost amplifiers 125a-d and preamplifiers 130a-d, respectively, allowing control of the amplification provided by the respective amplifiers. For example, a single OCM may be used to detect the outputs of the boost amplifier and the preamplifier associated with the same span of an optical system. As illustrated in FIG. 1, boost amplifier 125a and preamplifier 130a are incorporated into a single amplifier device 142a. Accordingly, OCM 140a of amplifier device 142a is configured to retrieve data from boost amplifier 125a and preamplifier 130a. Similarly, OCM 140b of amplifier device 142b is configured to retrieve data from boost amplifier 125b and preamplifier 130b, OCM 140c of amplifier device 142c is configured to retrieve data from boost amplifier 125c and preamplifier 130c, and OCM 140d of amplifier device 142d is configured to retrieve data from boost amplifier 125d and preamplifier 130d. In example optical systems that include the in-line amplifiers discussed above, the in-line amplifiers may also be configured with OCMs.

OCMs 140a-d (as well as OCMs associated with intermediate in-line amplifiers) may be configured according to the techniques disclosed herein to distinguish anomalous data within these detected signals from the intended channel data associated with transponders 110a-n and 112a-n. In response to these determinations, the elements of optical system 100 may be controlled to eliminate such anomalous data. For example, boost amplifiers 125a-d and preamplifiers 130a-d may be controlled to eliminate such anomalous data from the transmitted signals and/or optical multiplexer/demultiplexer 115a and 115b may be controlled to drop anomalous optical data such that the anomalous data is not provided to transponders 110a-n and 112a-n.

As explained in detail below, the techniques of the present disclosure analyze optical channel spectrum data that includes amplified spontaneous emission data and channel data associated with optical signals propagated through an optical fiber. Accordingly, the techniques may obtain optical channel data from one or more of OCMs 140a-d. An amplified spontaneous emission trend is fit to the amplified spontaneous emission data, and a channel trend is fit to the channel data. The amplified spontaneous emission trend and the channel trend are jointly optimized to determine an optimized channel trend. Finally, an anomaly in the channel data is identified based upon the optimized channel trend.

The techniques of this disclosure leverage robust fitting techniques and unsupervised learning algorithms to automatically estimate the trend of an input spectrum retrieved using OCMs, such as one or more of OCMs 140a-d of FIG. 1. For example, the disclosed techniques may fit a trend to the ASE within spectrum data acquired via one or more of OCMs 140a-d. The disclosed techniques may also fit a trend to the channel data within the acquired spectrum data. The ASE trend and the optical channel trend are then jointly optimized to determine an optimized channel trend. Reliable estimates of the trend are then used to solve the channel discovery and the anomaly detection problems.

The ASE and channel trends may be jointly optimized because the above-described spectrum modifications (e.g., insertion of ASE, spectrum tilting, non-linear effects, modifications due to degradation of the fiber over time, chromatic dispersion, wavelength dependent fiber attenuation, etc.) may affect both the ASE and channel trends. By jointly optimizing the ASE and channel trends, the effects of the modifications, such as tilt, may be included in the optimized channel trend. Once identified, the modifications may be compensated for to correctly identify anomalies within the channel data that might otherwise be difficult to identify. Using anomaly 210 of FIG. 2 as a specific example, by understanding the effect of tilt on the channel data, the effect of the tilt may be compensated for, allowing anomaly 210 to be correctly identified as an anomaly.

The disclosed techniques may provide for the following results, which have been successfully tested over a large dataset of real and simulated OCM spectra:

1. Discovery of an arbitrary number of channels over the frequency spectrum and the location of their central frequency with the same precision of the OCM raw data;
2. Detection of anomalous channels that are poorly equalized or new-birthing channels, even in the presence of a spectrum that follows a non-linear, power distribution trend, both for channel and ASE distributions;
3. Identification of the channels and ASE trends; and/or
4. Prediction of possible de-trending tilt that enables an accurate spectrum equalization.

As discussed below, the disclosed techniques perform joint channel trend and ASE trend optimization and may take into account the entire spectrum to discover channels and detect anomalies. Moreover, in contrast with related art techniques, these techniques may identify anomalies without comparing spectra from different sources (e.g., the transmitter and receiver) and may not need to rely on control channel data or assumptions about frequency occupation or distribution.

Furthermore, the disclosed techniques may identify the channel trends, even when there is a small number of channels present in the spectrum data, in order to provide the best knowledge for the power amplifier gain regulation, suggesting possible spectrum tilt detrending and discover possible channel intrusion, among other possible use cases.

Figure 3:
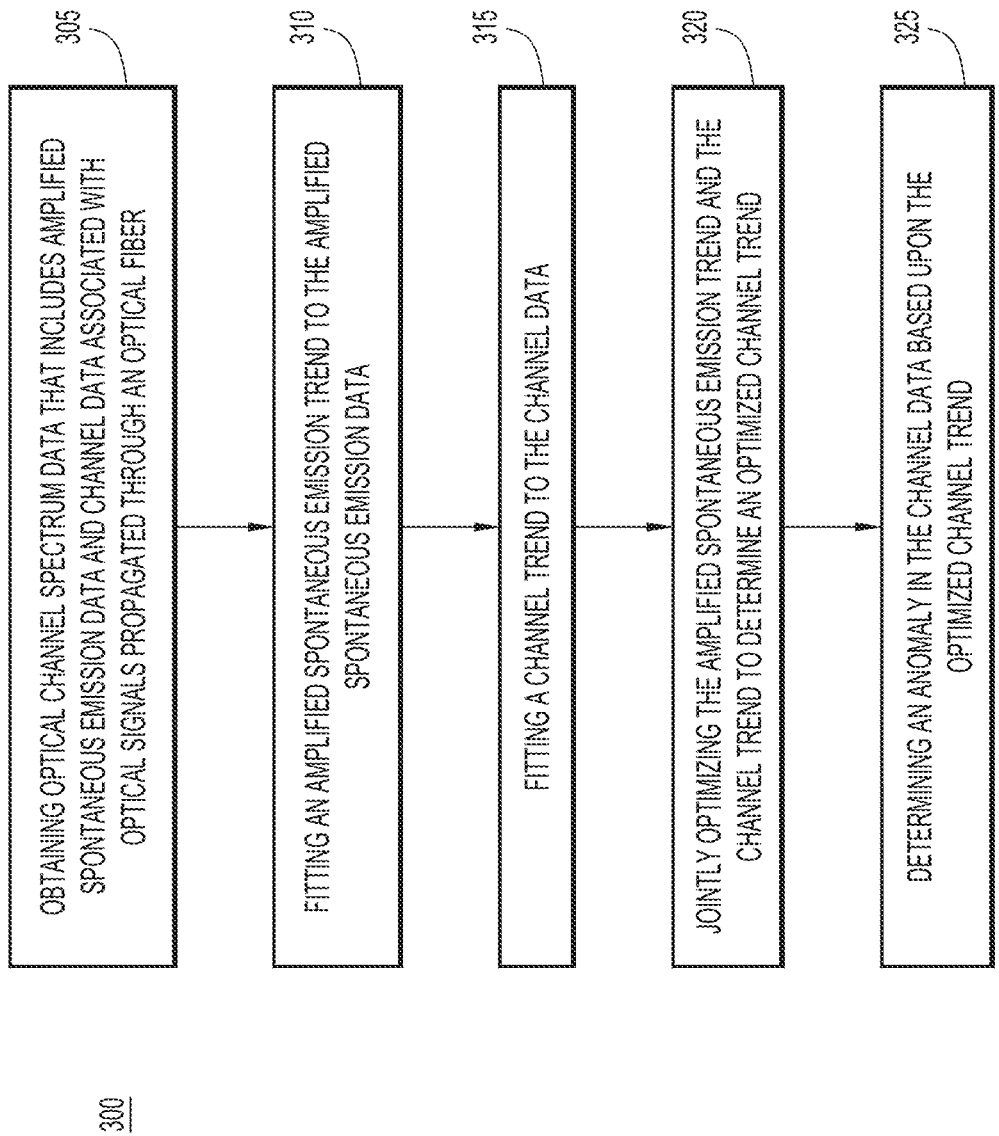
FIG. 3 depicts a flowchart providing a generalized process flow for implementing the optical channel trend identification and anomaly detection techniques of the present disclosure, according to an example embodiment.

With reference now made to FIG. 3, illustrated therein is a flowchart 300 that provides a generalized process flow for implementing the channel trend and anomaly detection techniques disclosed herein. Flowchart 300 beings in operation 305 in which optical channel spectrum data is obtained. This optical channel spectrum data includes ASE data and channel data associated with optical signals propagated through an optical fiber. For example, operation 305 may be embodied as the obtaining of optical channel spectrum data 200 of FIG. 2.

Next, an ASE trend is fit to the ASE data in operation 310 and a channel trend is fit to the channel data in operation 315. As explained in detail below, the ASE trend and the channel trend may both be polynomial trends. For example, the polynomial trends fit to the ASE data and the channel data can be of the same degree or a different degree. Similarly, the polynomial trends may be of a degree greater than one.

In operation 320, the ASE trend and the channel trend are jointly optimized to determine an optimized channel trend. Operation 320 jointly optimizes the ASE trend and the channel trend because these two trends should be similar as both the channel data and the ASE data may undergo the same amplification process. In contrast, anomalies due to wrong equalization or initial phase of a channel insertion, may not follow the same trend. Accordingly, by jointly optimizing the channel trend and the ASE trend, the influence of anomaly data on the channel trend may be lessened.

Finally, in operation 325, an anomaly in the channel data is determined based upon the optimized channel trend. For example, data associated with a maximum, such as anomaly 210 of FIG. 2, may be determined as being an anomaly because it deviates from an optimized channel trend determined in operation 320.

The operations of flowchart 300 may leverage robust fitting and unsupervised machine learning methods. Furthermore, the operations of flowchart 300 may be integrated in the embedded devices of an optical channel without requiring Graphical Processing Unit (GPU) resources at the termination point. Instead, the software or hardware configured to implement the disclosed techniques may leverage the computational capability of existing optical channel termination point devices. For example, the OCMs, control route processors, and other devices within the optical system with access to the OCM spectrum data may be configured to implement the operations of flowchart 300 without requiring GPU resources at the termination point.

The techniques of the present disclosure may also leverage additional operations, including spectrum pre-processing, estimation of principal linear trends in the spectrum data, removal of drop data, separating of channel and ASE data, peak detection, de-tilting, and center frequency refinement. These additional operations, as well as more detailed examples of the operations performed in flowchart 300 of FIG. 3 shall now be described with reference to FIGS. 4-14 below. The examples illustrated through FIGS. 4-14 begin subsequent to obtaining spectrum data from, for example, an OCM (e.g., OCMs 140*a*-*d*).

Spectrum Preprocessing

Figure 4:
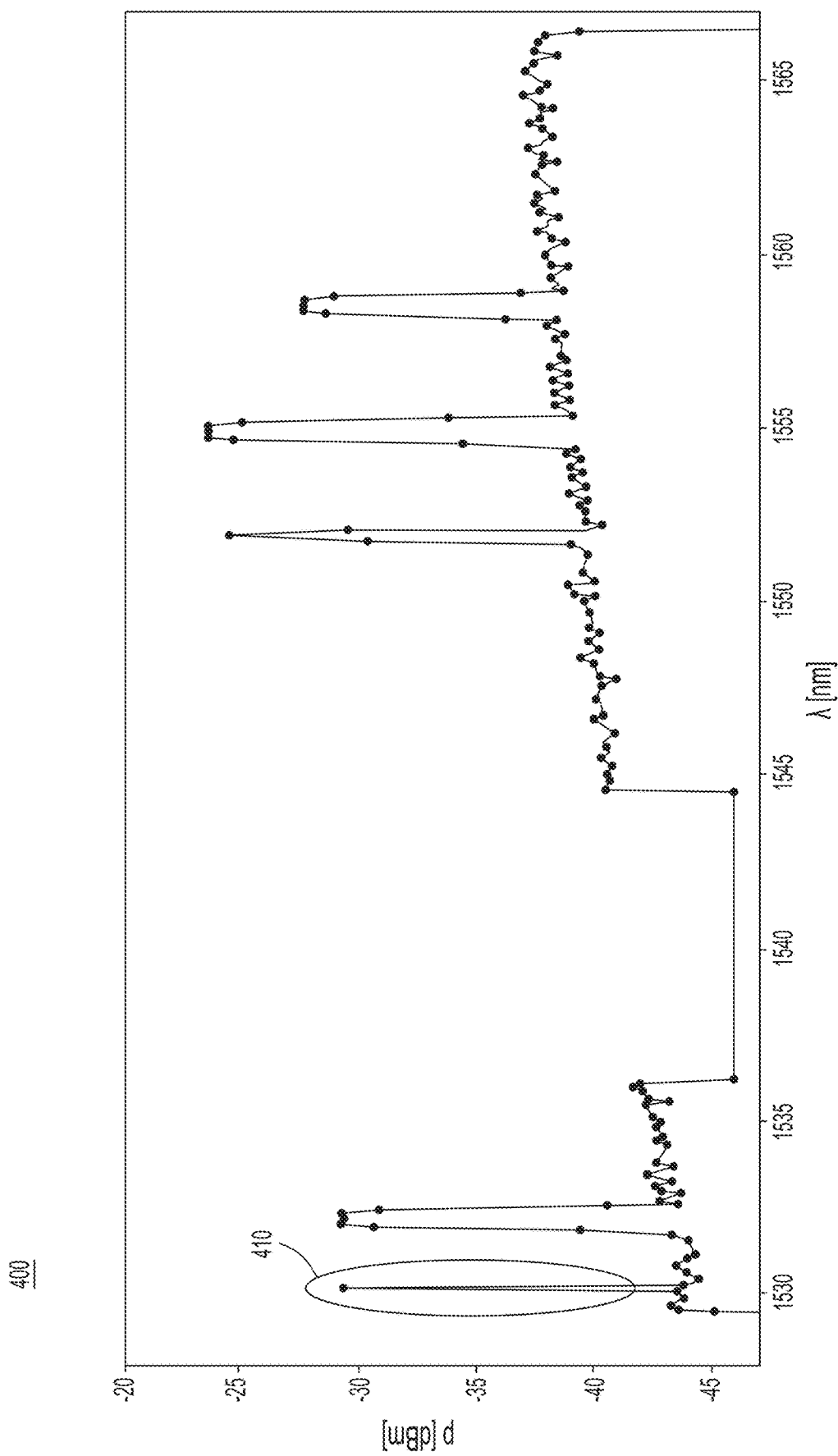
FIG. 4 presents second optical channel spectrum data to which the optical channel trend identification and anomaly detection techniques of the present disclosure may be applied, according to an example embodiment.
Figure 5:
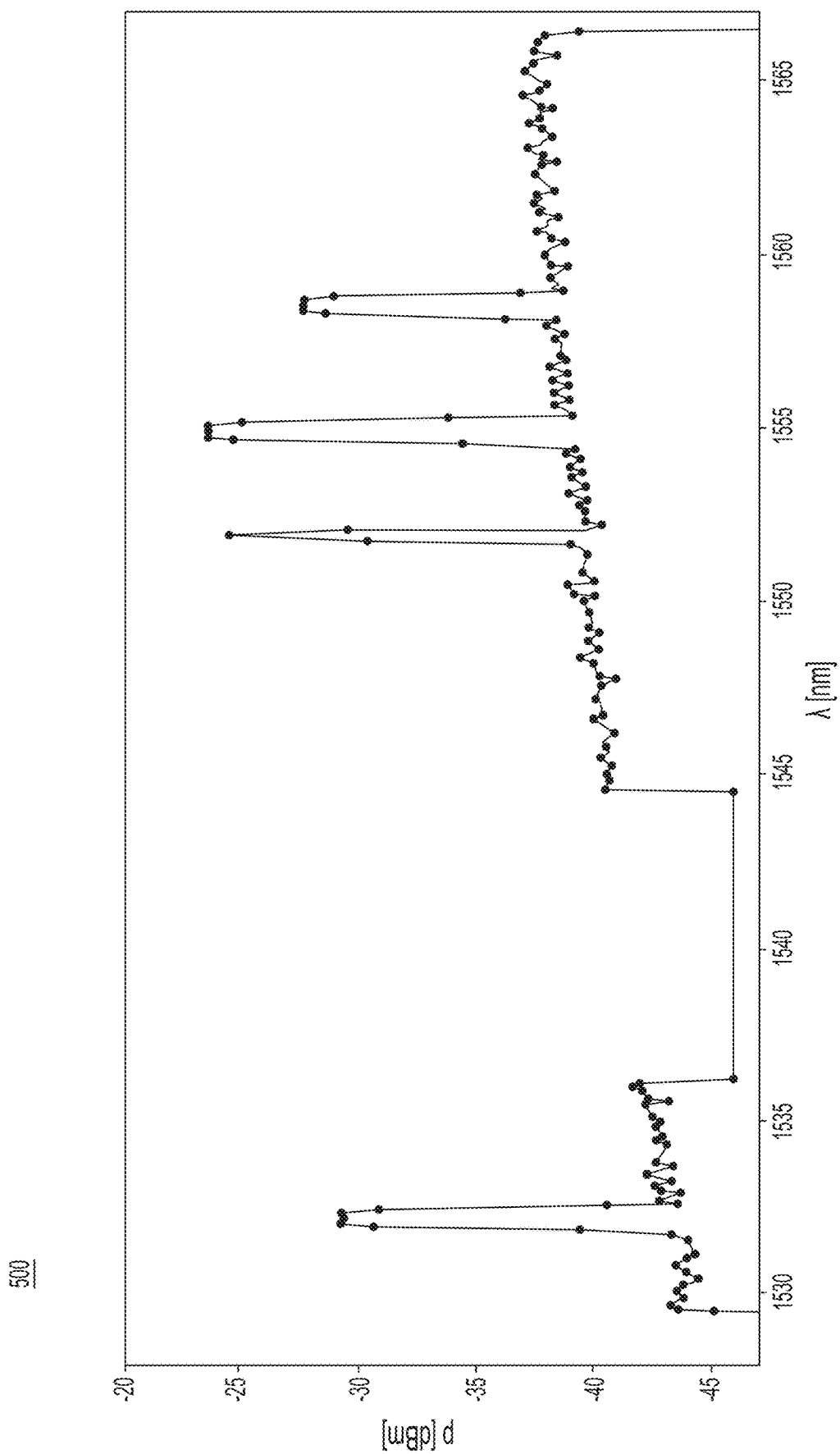
FIG. 5 presents optical channel spectrum data after median filtering has been applied thereto as part of the optical channel trend identification and anomaly detection techniques of the present disclosure, according to an example embodiment.

Illustrated in FIG. 4 is spectrum data 400. Spectrum data 400 may be pre-processed to remove impulse noise within the spectrum data before further channel and anomaly detection operations are performed. For example, spectrum data 400 may be processed using a one-dimensional median filter with a fixed-sized window. Such a median filter removes corrupted samples from the spectrum data. Other impulsive noise removal techniques based on different statistics may be applied as well. Accordingly, impulse noise 410 is removed from spectrum data 400, as illustrated in the difference between spectrum data 400 of FIG. 4 and pre-processed spectrum data 500 of FIG. 5.

Estimation of Principal Linear Trends

Figure 6:
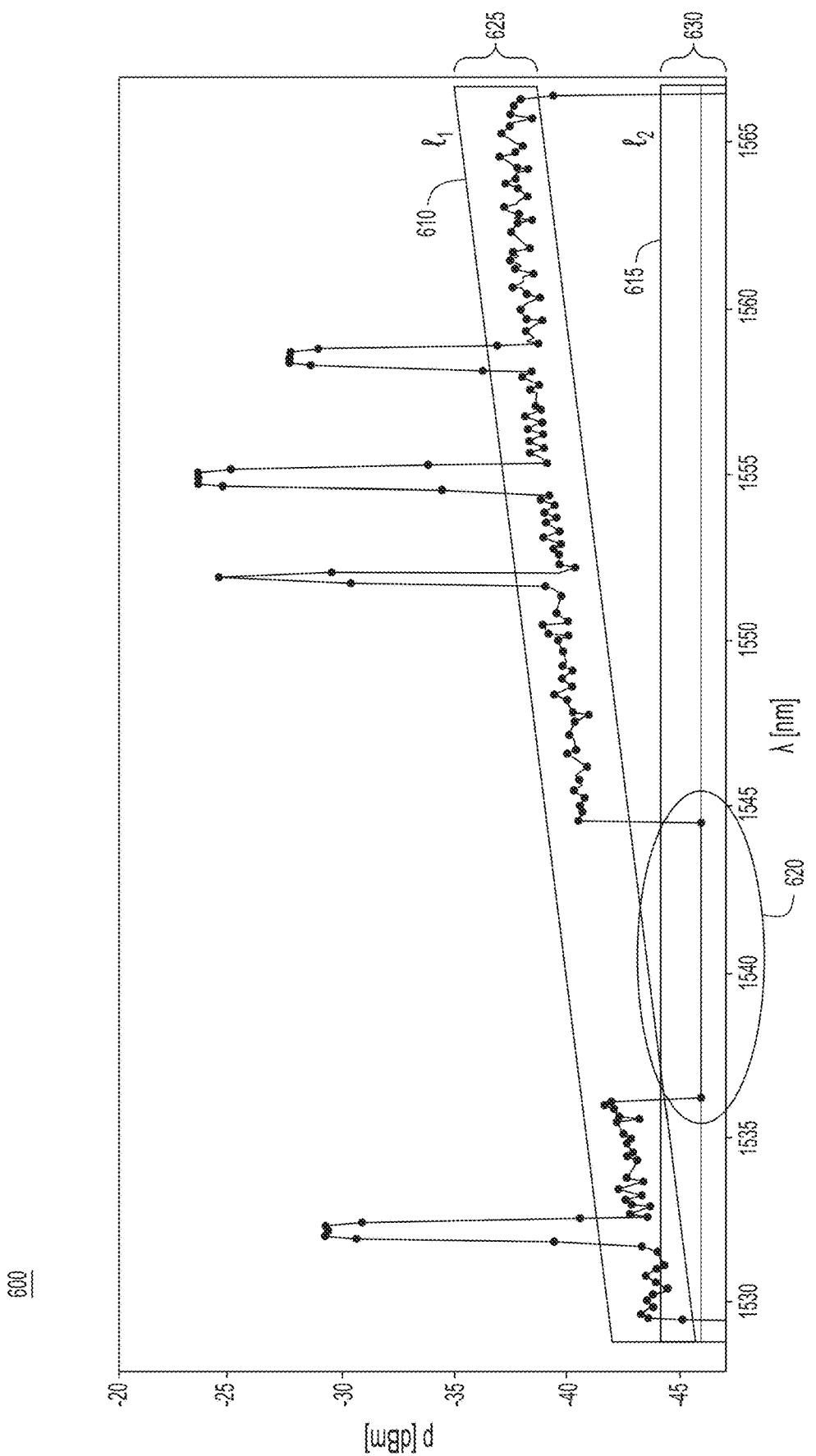
FIG. 6 illustrates linear trends applied to the optical channel spectrum data as part of the optical channel trend identification and anomaly detection techniques of the present disclosure, according to an example embodiment.

Next, linear trends within the spectrum data are estimated, as illustrated in FIG. 6. For example, spectrum data 600 of FIG. 6 includes multiple linear trends that characterize the OCM spectrum—first linear trend 610 is associated with the ASE data (and designated $\vartheta_1$) and second linear trend 615 is associated with add/drop data 620 (and designated $\vartheta_2$). Linear trend 610 illustrates the tilts introduced by amplifiers or the decay of the spectrum. Such trends are estimated by leveraging robust multi-model fitting techniques, such as those based on Random Sample Consensus (RANSAC), that can tolerate a high percentage of outliers when an estimate of the noise is provided in the form of an inlier threshold. Additional linear trends such as linear trend 615 may also be present due to, for example, add-and-drop sections and other phenomena affecting specific regions of the spectrum data 600. In order to accommodate for noise, rather large inlier bands are considered, to achieve a smooth polynomial trend without over segmenting the trend of the OCM spectrum. Trends 610 and 615 have such large inlier bands, as illustrated through their respective thicknesses 625 and 630. Once linear trends 610 and 615 are identified, add/drop data 620 can be identified as drop data and eliminated from spectrum data 600.

Drop Data Removal

It is generally the case that a single trend describing the ASE will exist in spectrum data, such as spectrum data 600, and that the ASE trend should be i) higher than drops and ii) supported by a number of samples comparable to or higher than the channels' samples in the OCM spectra. These characteristics of an ASE trend may be leveraged to identify the ASE trend and separate it from possible drops in the spectrum data 600. While drop data 620 appears to follow a horizontal trend, this may not always be the case as drop data undergo some amplification. It is also noted that the highest trend might be associated with channels/anomalies, not necessarily the ASE trend. Therefore, the following process may be used to identify and remove drops, as well as correctly identify the ASE trend. This process may be leveraged to identify drop data 620 as drop data and remove it from spectrum data 600.

First, the estimated trends are ranked from the highest to the lowest. To this purpose, the process computes for each trend the average (signed) distance from all the points but its inliers. By this value, the process ranks trends starting from those that were higher on average. Using this method, linear trend 610 will be ranked higher than trend 615. It then follows that the highest trend corresponds to:

The ASE trend when channels and/or anomalies did not give rise to a trend, or

The channel trend, and in this case the second-highest trend corresponds to the ASE.

The process then counts the number of samples lying over the highest trend, and if there is a sufficient number of points, then this means that the highest trend corresponds to the ASE and the channels/anomalies have been considered as outliers in the fitting steps. In contrast, when there are no points higher than the identified trend, this means that the highest trend describes the channels and/or anomalies, and the second-highest trend refers to the ASE.

In spectrum data 600, trend 610 is determined to be the ASE trend as there are a sufficient number of samples above trend 610, which are the channel and/or anomaly samples. Because trend 610 is the ASE trend, this means that trend 615 is the trend for drop data and drop data 620 may be eliminated from the spectrum data, as illustrated in spectrum data 700 of FIG. 7.

Separate the ASE and Channel Samples

Figure 7:
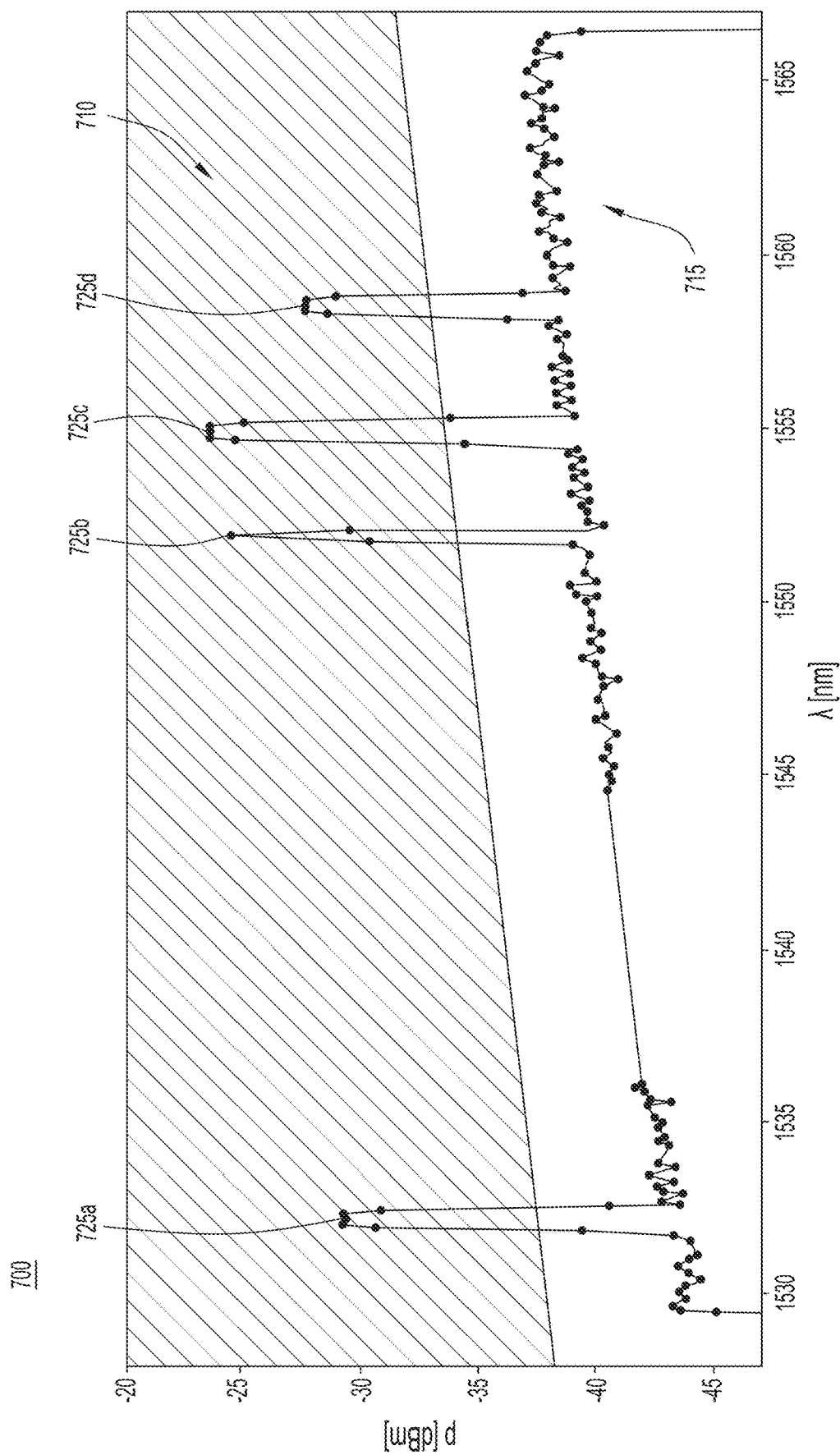
FIG. 7 illustrates the clustering of optical channel spectrum data into channel data and amplified spontaneous emission data as part of the optical channel trend identification and anomaly detection techniques of the present disclosure, according to an example embodiment.
Figure 8:
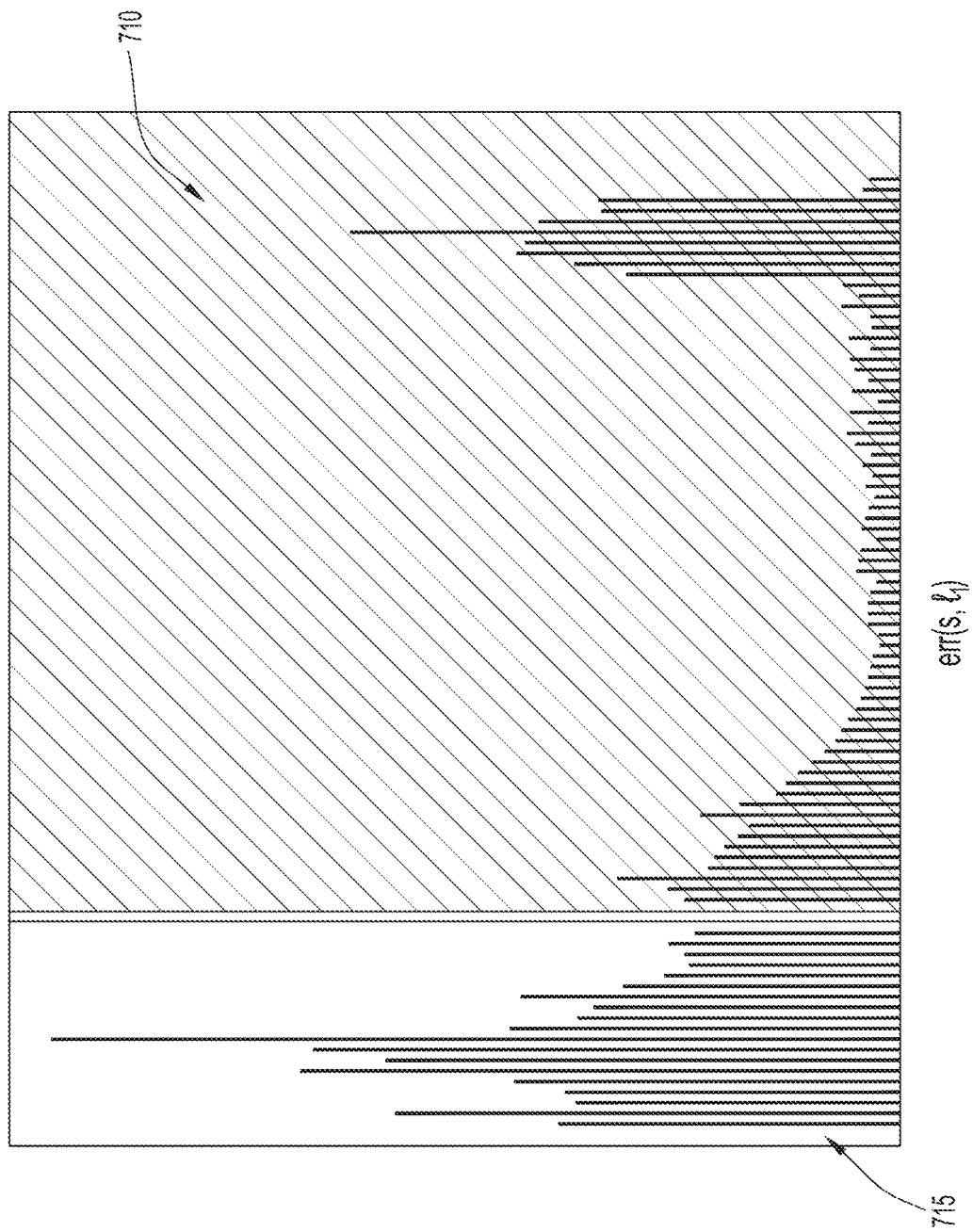
FIG. 8 illustrates the distribution of residuals in the optical channel spectrum data according to the optical channel trend identification and anomaly detection techniques of the present disclosure, according to an example embodiment.

After having identified the ASE trend and discarded the drop data 620, all the remaining spectrum data samples may be clustered in two groups: ASE data and channel data. At this point in the process, anomalies may be included in the channel data. This clustering is shown in spectrum data 700 of FIG. 7, with channel data 710 appearing in the shaded region and ASE data 715 appearing in the unshaded region. To separate the spectrum data 700 into channel data 710 and ASE data 715, the distance of each sample from the ASE trend 610 (illustrated in FIG. 6) is calculated. Unsupervised machine learning techniques may be used to dichotomize the distances in two groups. Points corresponding to large residuals are associated to the cluster channel data, while samples yielding small residuals (thus corresponding to the inliers of the estimated ASE trend) are associated to the cluster of ASE data. The distributions illustrated in FIG. 8 are the distribution of residuals, namely err(s, $\vartheta_1$) and the output of clustering over the samples of the ASE trend, where the shaded region denotes tentative channel data 710 and the unshaded region denotes tentative ASE data 715.

Peak Detection

Returning to FIG. 7, once the spectrum data 700 is dichotomized/clustered into channel data 710 and ASE data 715, peaks are located within the channel data 710. The peaks within the channel data 710 are the best candidates for locating channels and anomalies. Towards that end, all the local maxima are extracted in this cluster by comparing the signal against its dilation over a filter (support of local maxima). Peaks with low value or low prominence are also discarded. As used herein, prominence refers to a measure how much the peak stands out due to its intrinsic height and its location relative to other peaks. In FIG. 7, samples 725*a*, 725*b*, 725*c*, 725*d* (725*a*-*d*) are determined to be the local peaks.

Estimate ASE and Channel Trends

Figure 9:
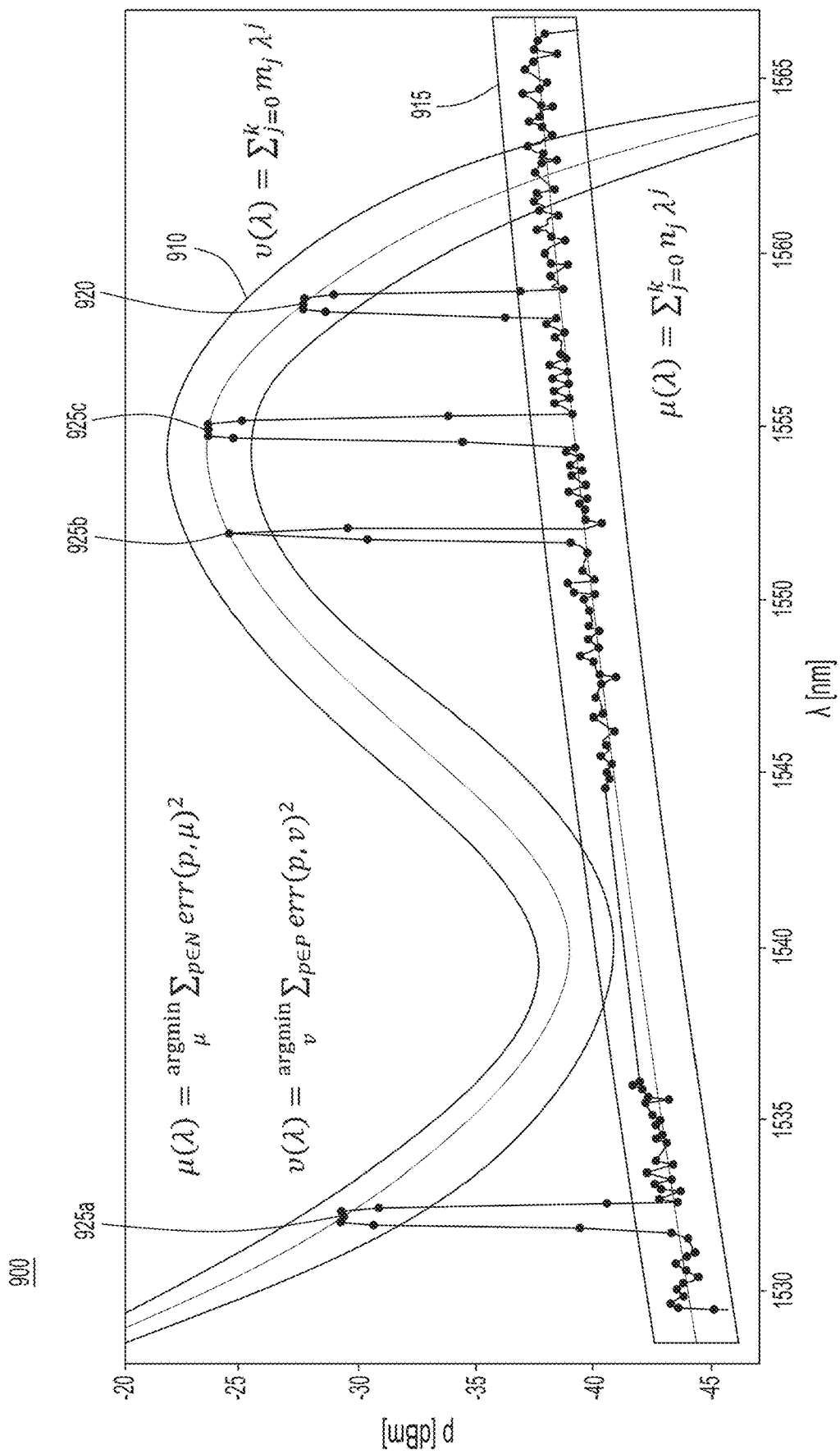
FIG. 9 illustrates a first trend fit to the peaks of the optical channel spectrum data and a second trend fit to the amplified spontaneous emission data of the optical channel spectrum data as part of the optical channel trend identification and anomaly detection techniques of the present disclosure, according to an example embodiment.

With the peaks identified, a trend is fit to the peaks as a channel trend. As shown in FIG. 9, channel trend 910 is fit to the peaks and ASE trend 915 is fit to the other data within spectrum data 900. Channel trend 910 is not fit in order to identify anomalies in samples that do not conform with this trend. Instead, channel trend 910 includes peaks of anomalies, specifically peak 920 which will be identified as an anomaly in the operations described below. Channel trend 910 is a polynomial trend fit to all the peaks, including anomaly peak 920. The polynomial of channel trend 910 can be of degree larger than one, and in the specific example of FIG. 9, channel trend 910 is a third degree polynomial. ASE trend 915 may also be a polynomial. According to specific example embodiments, ASE trend 915 is a polynomial of the same degree as channel trend 910 but in general the trends may have different degrees. Accordingly, channel trend 910 and ASE trend 915 are defined by equations (1) and (2) respectively:

$$\upsilon(\lambda) = \Sigma_{j=0}^{k} m_j \lambda^j \qquad (1)$$

$$\mu(\lambda) = \Sigma_{j=0}^{k} n_j \lambda^j \qquad (2)$$

Channel trend 910 may be fit separately from ASE trend 915, though the same single-model robust fitting procedure may be used to fit both the channel trend 910 and the ASE trend 915. Accordingly, more specific examples of channel trend 910 and ASE trend 915 are defined by equations (3) and (4) respectively:

$$\mu(\lambda) = \operatorname*{argmin}_{\mu} \sum_{p \in N} err(p, \mu)^2 \qquad (3)$$

$$\upsilon(\lambda) = \operatorname*{argmin}_{\upsilon} \sum_{p \in P} err(p, \upsilon)^2 \qquad (4)$$

where err(p,v) denotes a robust loss function corresponding to the selected robust fitting criteria. The coefficients of polynomials v and μ returned by the robust fitting are stored for use in the joint optimization of these trends discussed below. As noted above, if spectrum data 900 contains a small number of channels, this fitting may be heavily influenced by anomalies, as is the case in channel trend 910.

The robust fitting techniques utilized may include RANSAC techniques, Least Median of Squares techniques, M-estimator Sample Consensus (MSAC) techniques, Graph Cut RANSAC (GC-Ransac) techniques, Marginalized Sample Consensus (MAGsac) techniques and others known to the skilled artisan. For example, a RANSAC fitting procedure may be run against the ASE data to determine the ASE trend and a separate RANSAC fitting procedure may be run against the channel data. According to such RANSAC techniques, two points are randomly selected from the data set, and a function such as a line or a polynomial is fit between the two points. A consensus for the fit is determined, which means the fit is evaluated to determine how may points from the data set are inliers to the fit. This process is repeated until a sufficiently large consensus is returned. For example, RANSAC procedures may be run until some threshold percentage of consensus data points are returned. This threshold value may be determined based upon historical or experimental data evaluated to determine the threshold needed to accurately identify channels and anomalies using the disclosed techniques. The threshold may also be determined using artificial intelligence and/or machine learning and statistical techniques.

Joint Optimization of the ASE and Channel Trends

Once the channel trend 910 and ASE trend 915 are determined, the next step is to jointly optimize these trends to eliminate or decrease the effect of anomalies on the channel trend. Generally, anomalies may have a large effect on the channel trend, particularly in spectrum data with a small number of channels. For example, spectrum data 900 includes three channels, illustrated through peaks 925*a*, 925*b*, 925*c* (925*a-c*), and one anomaly, illustrated through peak 920. Accordingly, channel trend 910 is greatly affected by peak 920. Furthermore, it may be the case that an anomaly may be a perfect inlier for the channel trend, as is the case with peak 920 and channel trend 910. Therefore, an additional fitting step is performed to eliminate or decrease the influence of anomalies on the estimated channels trend. As described below, jointly optimizing the channel trend and the ASE trend may eliminate or decrease the effect of anomalies on the channel trend.

Jointly optimizing the channel trend and the ASE trend should decrease the effect of anomalies on the channel trend because both channel and ASE optical signals undergo the same amplification process. Accordingly, the channel samples and the ASE samples should follow a similar trend, but with an offset in power. In contrast, anomalies will generally not follow the same trend as the channel and ASE samples due to, for example, incorrect equalization or a difference in the initial phase of a channel insertion. Therefore, a joint optimization of ASE and channel trends is performed to bring the trends in closer conformity, except with an offset in power, thereby lessening the effect of the anomalies on the channel trend.

Figure 10:
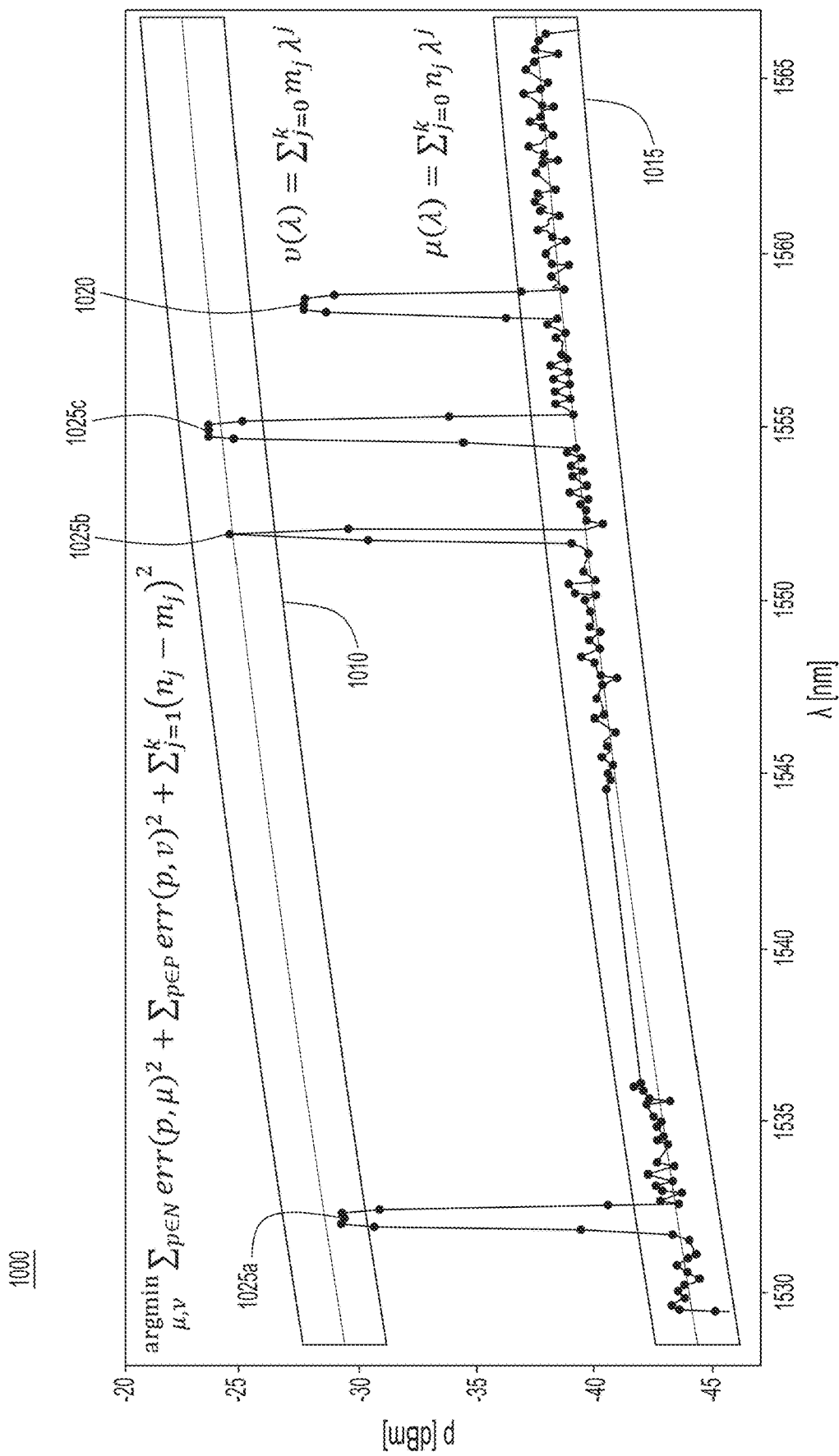
FIG. 10 illustrates the joint optimization of the first trend and the second trend as part of the optical channel trend identification and anomaly detection techniques of the present disclosure, according to an example embodiment.

Turning to FIG. 10, illustrated therein is spectrum data 1000 and accompanying jointly optimized channel trend 1010 and jointly optimized ASE trend 1015. As illustrated in FIG. 10, jointly optimized channel trend 1010 is similar to jointly optimized ASE trend 1015, substantially differing only in a power offset of the trends. Furthermore, it will be understood that anomaly peak 1020 has less influence on jointly optimized channel trend 1010 than anomaly peak 920 has on channel trend 910 of FIG. 9. For example, anomaly peak 1020 is an outlier of jointly optimized channel trend 1010, but anomaly peak 920 is an inlier of channel trend 910 of FIG. 9.

In the specific example of FIG. 10, joint optimization of the channel trend and the ASE trend sums the squared errors of the two trends (i.e., sums equations (3) and (4) discussed above) as well as adding a term taking into account the distance between the coefficients of the estimated polynomials of the unoptimized ASE and channel trends, excluding the zero-th degree coefficient to enable the offset in power between the two trends. Accordingly, the optimized trends are given by the following equation:

$$\text{Jointly Optimized Trend} = \underset{\mu, v}{\text{argmin}} \sum_{p \in N} err(p, \mu)^2 + \sum_{p \in P} err(p, v)^2 + \sum_{j=1}^{k}(n_j - m_j)^2 \quad (5)$$

The joint optimization of channel and ASE trends may be performed using non-linear optimization routines. Such optimizations may also be assessed based on the separation between the unoptimized ASE and channel trends.

Classifying Samples as Channel or Anomaly Data

Figure 11:
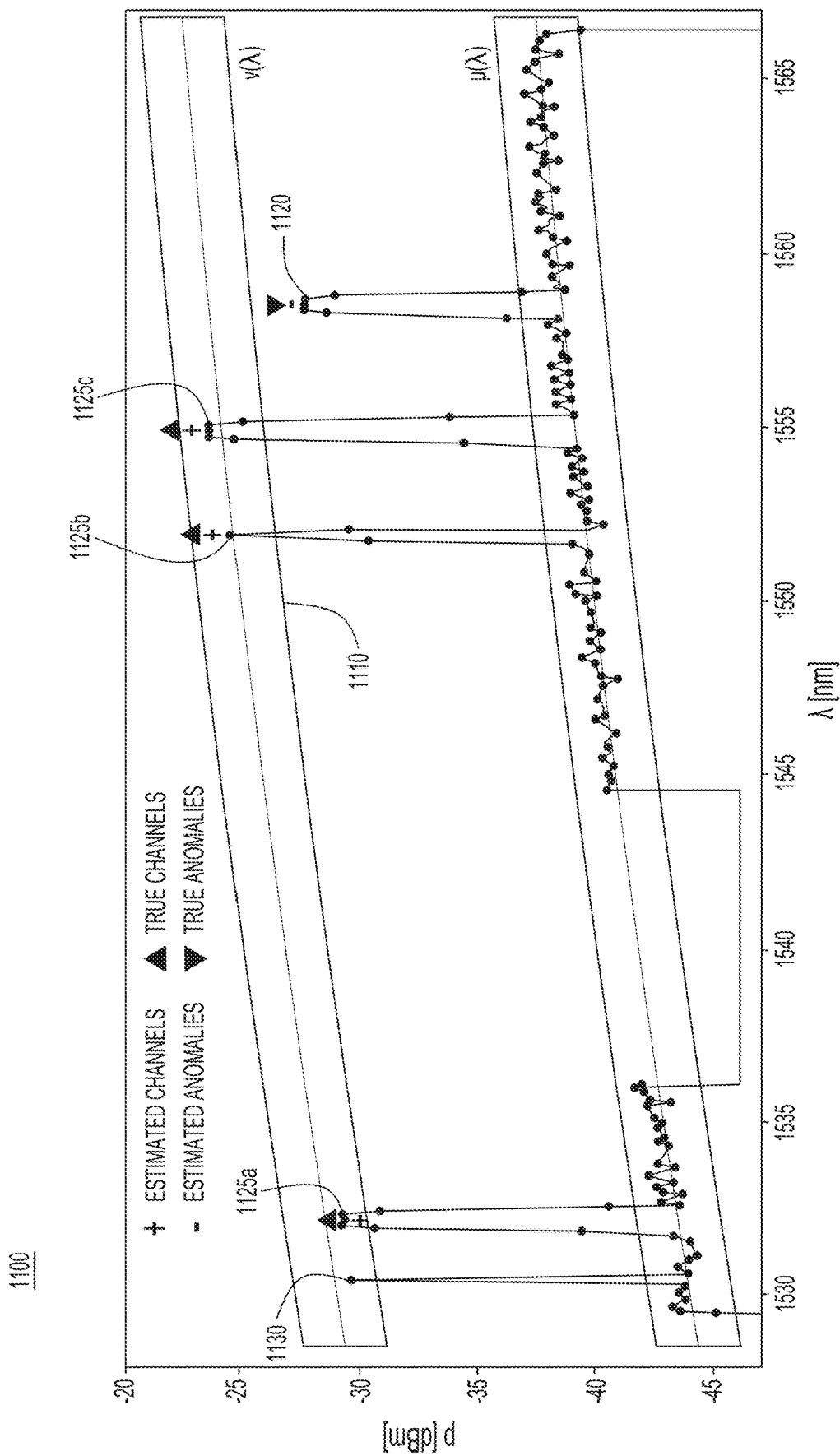
FIG. 11 illustrates optical channels and anomalies identified according to the optical channel trend identification and anomaly detection techniques of the present disclosure, according to an example embodiment.

After jointly optimizing the channel and ASE trends, the channel data is classified as belonging to a channel or an anomaly based on the presence (or absence) of peaks in the inlier band for the jointly optimized channel trend. As illustrated in FIG. 11, the jointly optimized channel trend is applied to the unprocessed spectrum data 1100, which is analogous to spectrum data 400 of FIG. 4. Peaks that fall inside the inlier band for the jointly optimized channel trend 1110 are considered as channels and peaks falling outside of the inlier band are considered anomalies. Accordingly, peaks 1125*a-c* are determined to be the channels as they fall in the inlier band of jointly optimized channel trend 1110, and peak 1120 is determined to be an anomaly as it falls outside the inlier band of jointly optimized channel trend 1110. Peak 1130 was previously determined to be impulse noise as discussed above with reference to FIG. 4, and therefore, is not determined to be a channel within spectrum data 1100. The above description refers to peaks being inside or outside the inlier band of the jointly optimized channel trend. Another way to view this evaluation is to evaluate which peaks are within a predetermined threshold value of the jointly optimized channel trend.

At this point in the process, the channels of spectrum data 1100 have been identified, as have the anomalies. As described above, these determinations were made without reference to control channel data transmitted between optical channel termination sites. For example, some optical channels, such as those provided by optical system 100 of FIG. 1, will transmit control data through a separate channel than the data channel to which the techniques of the present disclosure may be applied. Some related art techniques rely on this control channel data to identify channel and anomaly data within optical channel spectrum data. However, the techniques disclosed herein may identify optical channel data and anomalous data without reference to such control channel data—the above-described techniques may identify channel data and anomaly data using only the spectrum data and the above-described fitting techniques. The disclosed techniques may provide specific benefits by relying on the optical channel spectrum data without reference to the control channel. For example, providing an accurate control channel requires that the optical channel termination points be correctly configured to identify the optical channels that are being utilized. If such configuration does not happen, or the configurations incorrectly identify the channels being utilized, anomaly detections techniques relying on the control channel data may fail. By identifying channels and anomalies without reference to control channel data, the disclosed techniques can correctly identify channels and anomalies even when the optical channel termination points are not configured to provide accurate control channel data.

The joint optimization of channel and ASE trends disclosed herein allows for additional benefits beyond channel and anomaly detection. These benefits include optical spectrum de-tilting and optical channel central frequency refinement. Processes for implementing these additional techniques are described below.

Optical Spectrum De-tilting

Figure 12:
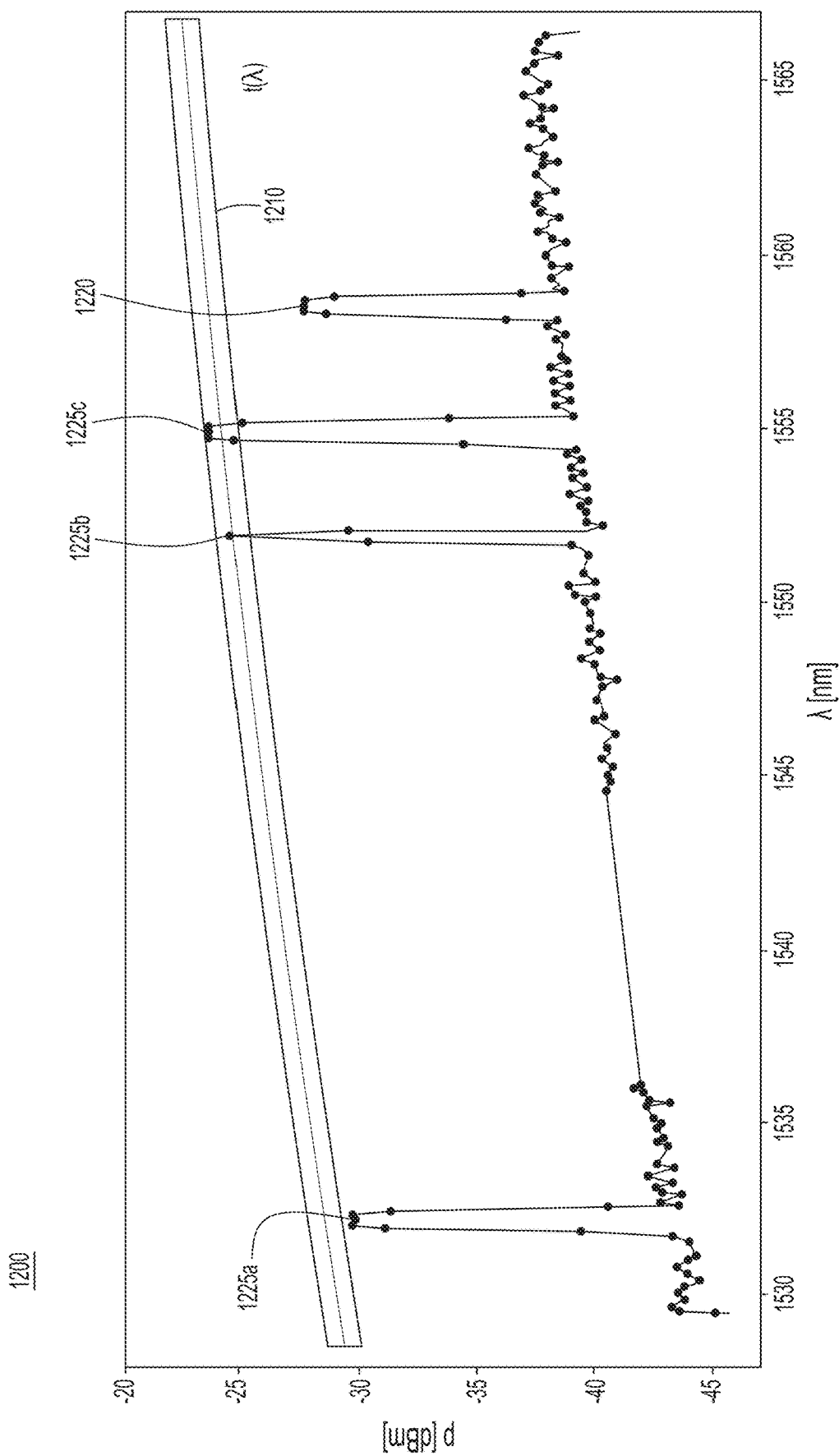
FIG. 12 illustrates a linear trend fit to the optical channel spectrum data used in de-tilting operations, according to an example embodiment.
Figure 13:
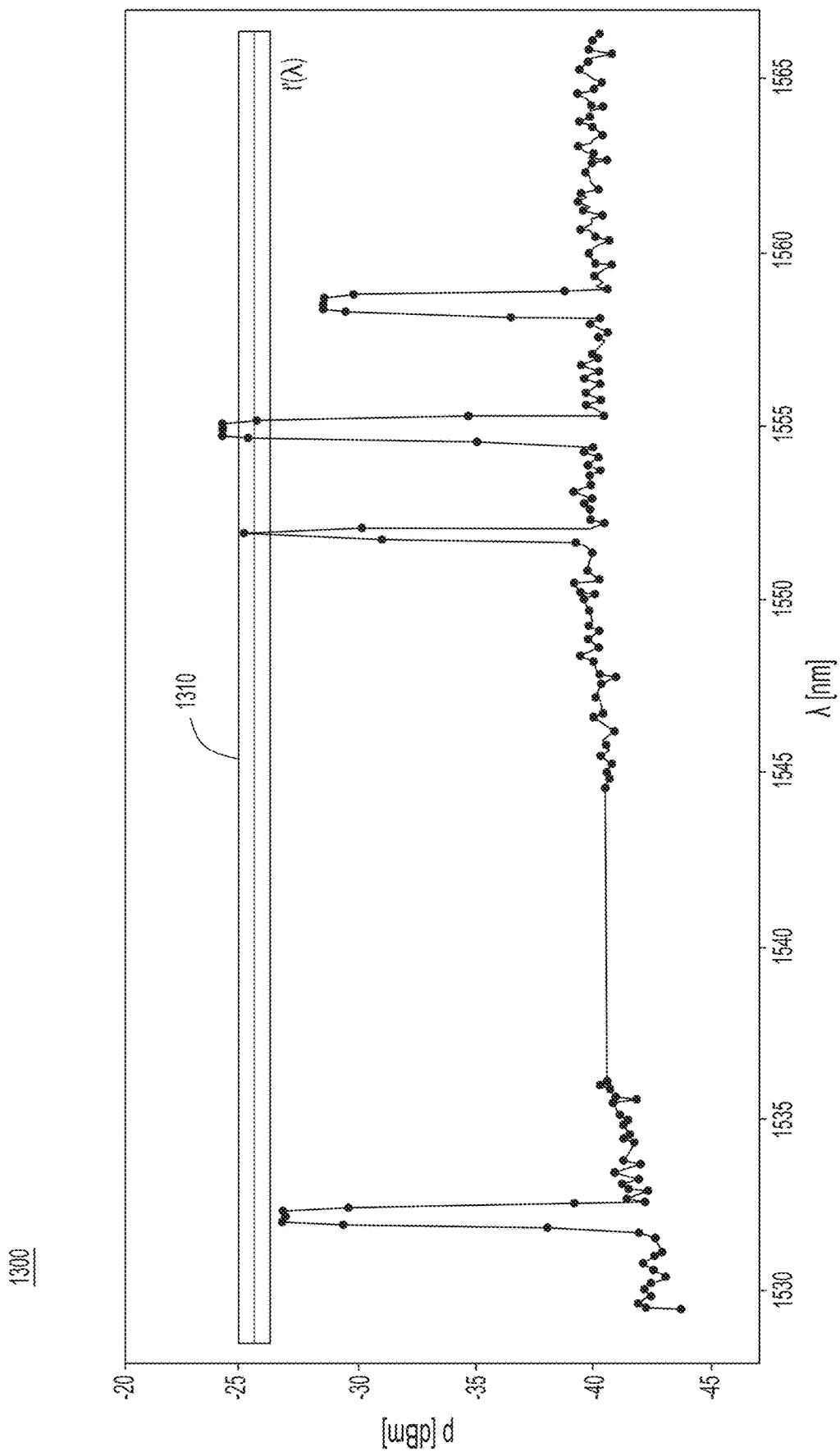
FIG. 13 illustrates the optical channel spectrum data after de-tilting, according to an example embodiment.

Optical spectrum de-tilting aims to restore a spectrum with equalized channels as if amplification and propagation through the optical fiber did not modify the frequencies and the ASE trend. De-tilting is performed by fitting a 1-degree polynomial (i.e., a linear trend) to the identified channels, and then subtracting the value of this trend from the entire spectrum data. The average intensity of the original spectrum is added back to preserve the average intensity. FIG. 12 illustrates the estimated linear tilt trend 1210 (designated $t(\lambda)$) in spectrum data 1200. Specifically, spectrum data 1100 includes three channels (associated with peaks 1225*a*, 1225*b*, 1225*c* (1225*a-c*)) and one anomaly (associated with peak 1220), which were identified according to the above-described techniques. Accordingly, linear tilt trend 1210 is determined from peaks 1225*a-c*, but not from peak 1220. Illustrated in FIG. 13 is spectrum data 1300, the spectrum data resulting from subtracting the value of linear tilt trend 1210 from spectrum data 1200 of FIG. 12. Spectrum data 1300 has a horizontal trend 1310, designated t'($\lambda$) in FIG. 13.

Channel Center Frequency Refinement

Figure 14:
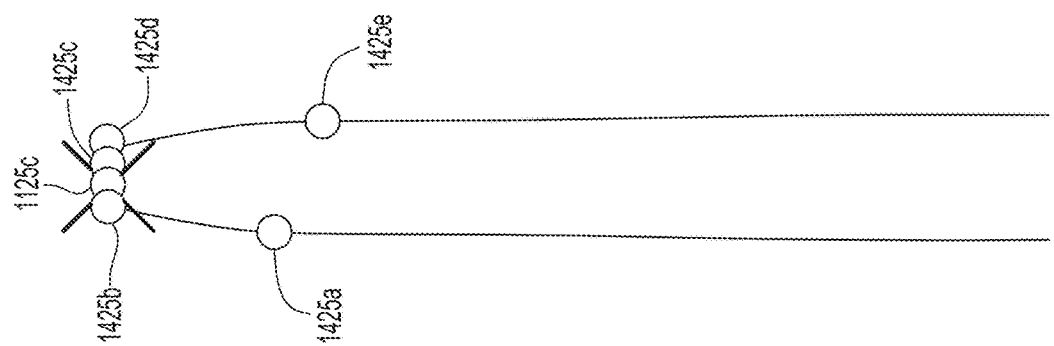
FIG. 14 illustrates the clustering of channel data samples used in optical channel center frequency refinement operations, according to an example embodiment.

Due to noise, the estimated channel peaks (e.g., peaks 925*a-c*, 1025*a*, 1025*b*, 1025*c* (1025*a-c*) and/or 1125*a*, 1125*b*, 1125*c* (1125*a-c*) of FIGS. 9-11, respectively) rarely fall at the center of the corresponding channel, and the highest peak might be located at the periphery of the channel (in particular for very flat channels) instead of at the center of symmetry for the channel. Refinement of the peaks may be used to minimize the localization error of the central frequencies due to this noise-induced peak shifting. Channel refinement is performed by considering the samples clustered around a peak. For example, illustrated in FIG. 14 is a detailed view of the samples clustered around peak 1125*c* of FIG. 11. In addition to the sample associated with peak 1125*c*, FIG. 14 also illustrates samples 1425*a*, 1425*b*, 1425*c*, 1425*d*, 1425*e* (1425*a-e*), all of which are associated with the channel identified from peak 1125*c*. A morphological analysis may be performed on the "bump" formed by this cluster of samples to determine the central frequency of the channel. For example, based upon the morphological analysis, the centroid of the "bump" may be identified which can be equated to the central frequency of the channel. According to the specific example of FIG. 14, a watershed algorithm is used to cluster the samples that belong to a "bump" supporting an optical channel. The central frequency for the optical channel is then determined as corresponding to the centroid of the "bump."

Figure 15:
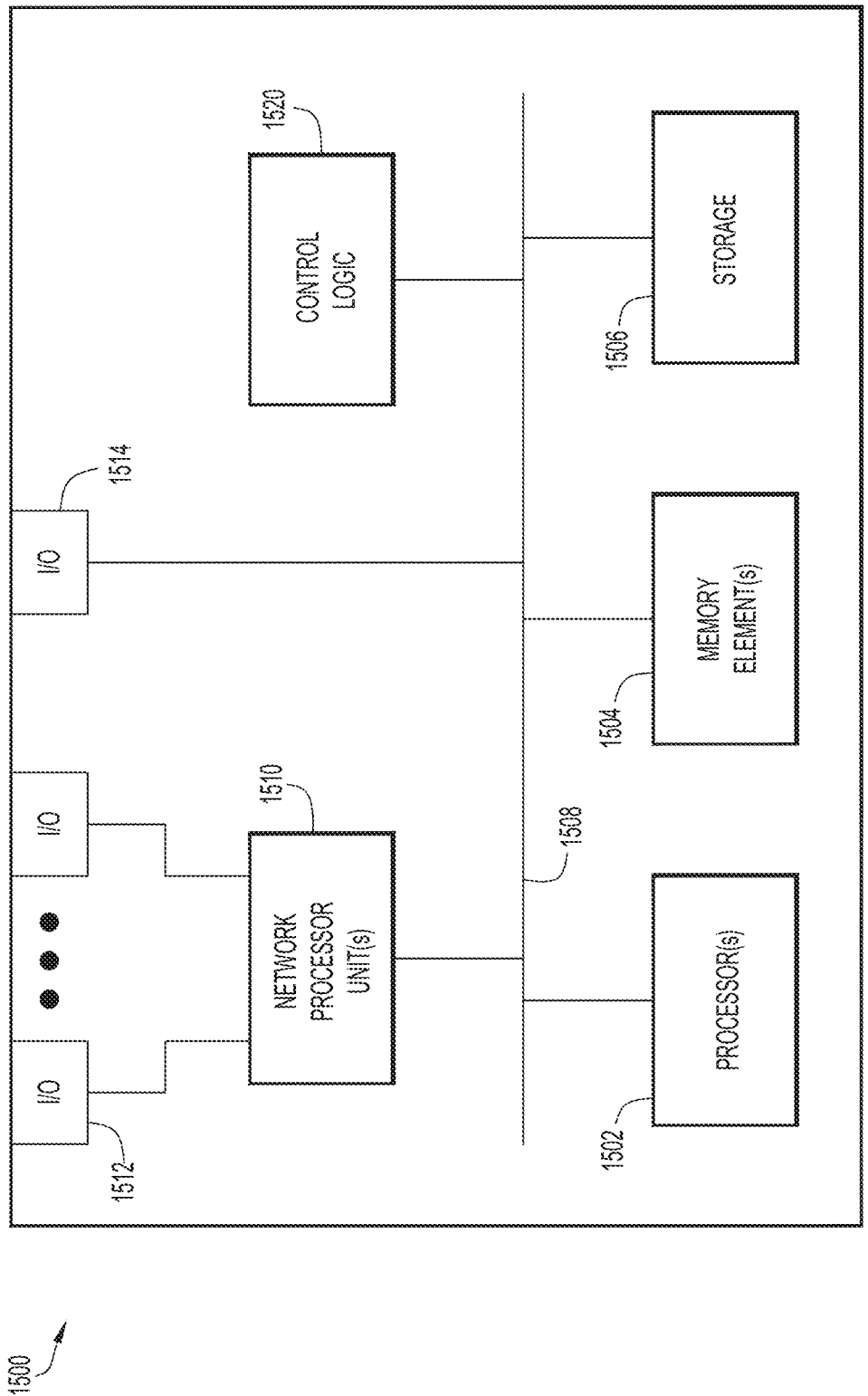
FIG. 15 is a block diagram of a computing device configured to implement the optical channel trend identification and anomaly detection techniques of the present disclosure, according to an example embodiment.

Referring to FIG. 15, FIG. 15 illustrates a hardware block diagram of a computing device 1500 that may perform functions associated with operations discussed herein in connection with the techniques depicted in FIGS. 1-14. In various embodiments, a computing device or apparatus, such as computing device 1500 or any combination of computing devices 1500, may be configured as any entity/entities as discussed for the techniques depicted in connection with FIGS. 1-13 in order to perform operations of the various techniques discussed herein.

In at least one embodiment, the computing device 1500 may be any apparatus that may include one or more processor(s) 1502, one or more memory element(s) 1504, storage 1506, a bus 1508, one or more network processor unit(s) 1510 interconnected with one or more network input/output (I/O) interface(s) 1512, one or more I/O interface(s) 1514, and control logic 1520. In various embodiments, instructions associated with logic for computing device 1500 can overlap in any manner and are not limited to the specific allocation of instructions and/or operations described herein.

In at least one embodiment, processor(s) 1502 is/are at least one hardware processor configured to execute various tasks, operations and/or functions for computing device 1500 as described herein according to software and/or instructions configured for computing device 1500. Processor(s) 1502 (e.g., a hardware processor) can execute any type of instructions associated with data to achieve the operations detailed herein. In one example, processor(s) 1502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1504 and/or storage 1506 is/are configured to store data, information, software, and/or instructions associated with computing device 1500, and/or logic configured for memory element(s) 1504 and/or storage 1506. For example, any logic described herein (e.g., control logic 1520) can, in various embodiments, be stored for computing device 1500 using any combination of memory element(s) 1504 and/or storage 1506. Note that in some embodiments, storage 1506 can be consolidated with memory element(s) 1504 (or vice versa) or can overlap/exist in any other suitable manner.

In at least one embodiment, bus 1508 can be configured as an interface that enables one or more elements of computing device 1500 to communicate in order to exchange information and/or data. Bus 1508 can be implemented with any architecture designed for passing control, data and/or information between processors, memory elements/storage, peripheral devices, and/or any other hardware and/or software components that may be configured for computing device 1500. In at least one embodiment, bus 1508 may be implemented as a fast kernel-hosted interconnect, potentially using shared memory between processes (e.g., logic), which can enable efficient communication paths between the processes.

In various embodiments, network processor unit(s) 1510 may enable communication between computing device 1500 and other systems, entities, etc., via network I/O interface(s) 1512 (wired and/or wireless) to facilitate operations discussed for various embodiments described herein. In various embodiments, network processor unit(s) 1510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1500 and other systems, entities, etc. to facilitate operations for various embodiments described herein. In various embodiments, network I/O interface(s) 1512 can be configured as one or more Ethernet port(s), Fibre Channel ports, any other I/O port(s), and/or antenna(s)/antenna array(s) now known or hereafter developed. Thus, the network processor unit(s) 1510 and/or network I/O interface(s) 1512 may include suitable interfaces for receiving, transmitting, and/or otherwise communicating data and/or information in a network environment.

I/O interface(s) 1514 allow for input and output of data and/or information with other entities that may be connected to computing device 1500. For example, I/O interface(s) 1514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1520 can include instructions that, when executed, cause processor(s) 1502 to perform operations, which can include, but not be limited to, providing overall control operations of computing device;

interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1504 and/or storage 1506 can store data, software, code, instructions (e.g., processor instructions), logic, parameters, combinations thereof, and/or the like used for operations described herein. This includes memory element(s) 1504 and/or storage 1506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi/Wi-Fi6), IEEE 802.16 (e.g., Worldwide Interoperability for Microwave Access (WiMAX)), Radio-Frequency Identification (RFID), NFC, Bluetooth™, mm.wave, UWB, etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, presented herein are techniques to automatically analyze OCM spectra in order to:

Estimate channels, including the number of channels, their power and their central frequencies.

Detect anomalies, such as wrongly equalized channels or channels detected in the creation/insertion phase for the optical channel.

Detect the channel trend and/or the ASE trend, which may be expressed with respect to one or more polynomial functions, even in the presence of only a few channels.

Automatically remove any trend induced by tilting from amplification or distortions from signal propagation without needing to use supervision or annotated training sets.

Based on the above-identified channel features, the disclosed techniques may be leveraged to compensate for possible non-linear effects like tilt and ripple, provide amplifier control applications with data indicative of the actual channels preventing anomalies from influencing automatic control, automatically identify intrusion into the system by providing intrusion detection systems with a reliable description of the spectrum and channels, and provide for the automatic identification of frequency shift issues.

The disclosed techniques may be particularly applicable to systems having high tilt caused by amplifiers with working points outside the flat range, systems with Raman amplification that is not properly tuned (i.e., with high channel ripple), and/or systems without channel equalization or with channel equalization processes that are not working properly. The disclosed techniques are novel in that they may not require control plane or provisioning data.

In some aspects, the techniques described herein relate to a computer-implemented method that includes: obtaining optical channel spectrum data that includes amplified spontaneous emission data and channel data associated with optical signals propagated through an optical fiber; fitting an amplified spontaneous emission trend to the amplified spontaneous emission data; fitting a channel trend to the channel data; jointly optimizing the amplified spontaneous emission trend and the channel trend to determine an optimized channel trend; and determining an anomaly in the channel data based upon the optimized channel trend.

In some aspects, the techniques described herein relate to a method, wherein determining the anomaly in the channel data based upon the optimized channel trend includes determining a maximum in the channel data that deviates from the optimized channel trend by a predetermined threshold value.

In some aspects, the techniques described herein relate to a method, wherein obtaining the optical channel spectrum data includes obtaining the optical channel spectrum data at a termination point of an optical channel.

In some aspects, the techniques described herein relate to a method, wherein jointly optimizing the amplified spontaneous emission trend and the channel trend to determine the optimized channel trend includes optimizing the channel trend such that the channel trend more closely matches the amplified spontaneous emission trend.

In some aspects, the techniques described herein relate to a method, further including eliminating dropped signal data from the optical channel spectrum data prior to fitting the amplified spontaneous emission trend to the amplified spontaneous emission data and prior to fitting the channel trend to the channel data.

In some aspects, the techniques described herein relate to a method, further including filtering impulse noise from the optical channel spectrum data prior to fitting the amplified spontaneous emission trend to the amplified spontaneous emission data and prior to fitting the channel trend to the channel data.

In some aspects, the techniques described herein relate to a method, where jointly optimizing the amplified spontaneous emission trend and the channel trend includes determining an optimized amplified spontaneous emission trend.

In some aspects, the techniques described herein relate to a method, further including de-tilting the optimized channel trend.

In some aspects, the techniques described herein relate to a method, further including categorizing the optical channel spectrum data into the amplified spontaneous emission data and the channel data.

In some aspects, the techniques described herein relate to a method, wherein categorizing the optical channel spectrum data into the amplified spontaneous emission data and the channel data includes categorizing the amplified spontaneous emission data as data within the optical channel spectrum data with low prominence and characterizing the channel data as data within the optical channel spectrum data with high prominence.

In some aspects, the techniques described herein relate to a method, wherein obtaining, fitting the amplified spontaneous emission trend, fitting the channel trend, jointly optimizing, and determining are performed without reference to control channel data.

In some aspects, the techniques described herein relate to an apparatus including: one or more input/output interfaces; and one or more processors configured to: obtain, via the one or more input/output interfaces, optical channel spectrum data that includes amplified spontaneous emission data and channel data associated with optical signals propagated through an optical fiber; fit an amplified spontaneous emission trend to the amplified spontaneous emission data; fit a channel trend to the channel data; jointly optimize the amplified spontaneous emission trend and the channel trend to determine an optimized channel trend; and determine an anomaly in the channel data based upon the optimized channel trend.

In some aspects, the techniques described herein relate to an apparatus, wherein the one or more processors are configured to determine the anomaly in the channel data based upon the optimized channel trend by determining a maximum in the channel data that deviates from the optimized channel trend by a predetermined threshold value.

In some aspects, the techniques described herein relate to an apparatus, wherein the one or more processors are configured to obtain the optical channel spectrum data by obtaining the optical channel spectrum data at a termination point of an optical channel.

In some aspects, the techniques described herein relate to an apparatus, wherein the one or more processors are configured to jointly optimize the amplified spontaneous emission trend and the channel trend to determine the optimized channel trend by optimizing the channel trend such that the channel trend more closely matches the amplified spontaneous emission trend.

In some aspects, the techniques described herein relate to an apparatus, wherein the one or more processors are further configured to de-tilt the optimized channel trend.

In some aspects, the techniques described herein relate to one or more tangible, non-transitory computer readable mediums encoded with instructions, wherein the instructions, when executed by one or more processors, are operable to: obtain optical channel spectrum data that includes amplified spontaneous emission data and channel data associated with optical signals propagated through an optical fiber; fit an amplified spontaneous emission trend to the amplified spontaneous emission data; fit a channel trend to the channel data; jointly optimize the amplified spontaneous emission trend and the channel trend to determine an optimized channel trend; and determine an anomaly in the channel data based upon the optimized channel trend.

In some aspects, the techniques described herein relate to one or more tangible, non-transitory computer readable mediums, wherein the instructions operable to determine the anomaly in the channel data based upon the optimized channel trend are further operable to determine a maximum in the channel data that deviates from the optimized channel trend by a predetermined threshold value.

In some aspects, the techniques described herein relate to one or more tangible, non-transitory computer readable mediums, wherein the instructions operable to obtain the optical channel spectrum data are further operable to obtain the optical channel spectrum data at a termination point of an optical channel.

In some aspects, the techniques described herein relate to one or more tangible, non-transitory computer readable mediums, wherein the instructions operable to jointly optimize the amplified spontaneous emission trend and the channel trend to determine the optimized channel trend are further operable to optimize the channel trend such that the channel trend more closely matches the amplified spontaneous emission trend.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   obtaining optical channel spectrum data that includes amplified spontaneous emission data and channel data associated with optical signals propagated through an optical fiber;
   fitting an amplified spontaneous emission trend to the amplified spontaneous emission data;
   fitting a channel trend to the channel data;
   jointly optimizing the amplified spontaneous emission trend and the channel trend to determine an optimized channel trend more closely corresponding to the amplified spontaneous emission trend than the channel trend corresponds to the amplified spontaneous emission trend; and
   determining an anomaly in the channel data based upon the anomaly falling outside a predetermined threshold value of the optimized channel trend.

2. The computer-implemented method of claim 1, wherein determining the anomaly in the channel data comprises determining a maximum in the channel data that deviates from the optimized channel trend by the predetermined threshold value.

3. The computer-implemented method of claim 1, wherein obtaining the optical channel spectrum data comprises obtaining the optical channel spectrum data at a termination point of an optical channel.

4. The computer-implemented method of claim 1, further comprising eliminating dropped signal data from the optical channel spectrum data prior to fitting the amplified spontaneous emission trend to the amplified spontaneous emission data and prior to fitting the channel trend to the channel data.

5. The computer-implemented method of claim 1, further comprising filtering impulse noise from the optical channel spectrum data prior to fitting the amplified spontaneous emission trend to the amplified spontaneous emission data and prior to fitting the channel trend to the channel data.

6. The computer-implemented method of claim 1, where jointly optimizing the amplified spontaneous emission trend and the channel trend comprises determining an optimized amplified spontaneous emission trend.

7. The computer-implemented method of claim 1, further comprising de-tilting the optimized channel trend.

8. The computer-implemented method of claim 1, further comprising categorizing the optical channel spectrum data into the amplified spontaneous emission data and the channel data.

9. The computer-implemented method of claim 8, wherein categorizing the optical channel spectrum data into the amplified spontaneous emission data and the channel data comprises categorizing the amplified spontaneous emission data as data within the optical channel spectrum data with low prominence and characterizing the channel data as data within the optical channel spectrum data with high prominence.

10. The computer-implemented method of claim 1, wherein obtaining, fitting the amplified spontaneous emission trend, fitting the channel trend, jointly optimizing, and determining are performed without reference to control channel data.

11. An apparatus comprising:
one or more input/output interfaces; and
one or more processors configured to:
obtain, via the one or more input/output interfaces, optical channel spectrum data that includes amplified spontaneous emission data and channel data associated with optical signals propagated through an optical fiber;
fit an amplified spontaneous emission trend to the amplified spontaneous emission data;
fit a channel trend to the channel data;
jointly optimize the amplified spontaneous emission trend and the channel trend to determine an optimized channel trend more closely corresponding to the amplified spontaneous emission trend than the channel trend corresponds to the amplified spontaneous emission trend; and
determine an anomaly in the channel data based upon the anomaly falling outside a predetermined threshold value of the optimized channel trend.

12. The apparatus of claim 11, wherein the one or more processors are configured to determine the anomaly in the channel data by determining a maximum in the channel data that deviates from the optimized channel trend by the predetermined threshold value.

13. The apparatus of claim 11, wherein the one or more processors are configured to obtain the optical channel spectrum data by obtaining the optical channel spectrum data at a termination point of an optical channel.

14. The apparatus of claim 11, wherein the one or more processors are further configured to de-tilt the optimized channel trend.

15. The apparatus of claim 11, wherein the one or more processors are further configured to eliminate dropped signal data from the optical channel spectrum data prior to fitting the amplified spontaneous emission trend to the amplified spontaneous emission data and prior to fitting the channel trend to the channel data.

16. The apparatus of claim 11, wherein the one or more processors are further configured to obtain the optical channel spectrum data, fit the amplified spontaneous emission trend to the amplified spontaneous emission data, fit the channel trend to the channel data, jointly optimize the amplified spontaneous emission trend and the channel trend to determine the optimized channel trend, and determine the anomaly in the channel data without reference to control channel data.

17. One or more tangible, non-transitory computer readable mediums encoded with instructions, wherein the instructions, when executed by one or more processors, are operable to:
obtain optical channel spectrum data that includes amplified spontaneous emission data and channel data associated with optical signals propagated through an optical fiber;
fit an amplified spontaneous emission trend to the amplified spontaneous emission data;
fit a channel trend to the channel data;
jointly optimize the amplified spontaneous emission trend and the channel trend to determine an optimized channel trend more closely corresponding to the amplified spontaneous emission trend than the channel trend corresponds to the amplified spontaneous emission trend; and
determine an anomaly in the channel data based upon the anomaly falling outside a predetermined threshold value of the optimized channel trend.

18. The one or more tangible, non-transitory computer readable mediums of claim 17, wherein the instructions operable to determine the anomaly in the channel data are further operable to determine a maximum in the channel data that deviates from the optimized channel trend by the predetermined threshold value.

19. The one or more tangible, non-transitory computer readable mediums of claim 17, wherein the instructions operable to obtain the optical channel spectrum data are further operable to obtain the optical channel spectrum data at a termination point of an optical channel.

20. The one or more tangible, non-transitory computer readable mediums of claim 17, wherein the instructions operable to obtain the optical channel spectrum data, fit the amplified spontaneous emission trend to the amplified spontaneous emission data, fit the channel trend to the channel data, jointly optimize the amplified spontaneous emission trend and the channel trend to determine the optimized channel trend, and determine the anomaly in the channel data are operable to perform these operations without reference to control channel data.

* * * * *